(12) United States Patent
Liu

(10) Patent No.: US 11,651,109 B2
(45) Date of Patent: May 16, 2023

(54) PERMISSION MANAGEMENT METHOD, PERMISSION VERIFICATION METHOD, AND RELATED APPARATUS

(71) Applicant: Tencent Technology (Shenzhen) Company Limited, Shenzhen (CN)

(72) Inventor: Pan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 214 days.

(21) Appl. No.: 17/147,355

(22) Filed: Jan. 12, 2021

(65) Prior Publication Data

US 2021/0133359 A1 May 6, 2021

Related U.S. Application Data

(63) Continuation of application No. PCT/CN2020/081526, filed on Mar. 27, 2020.

(30) Foreign Application Priority Data

Mar. 28, 2019 (CN) .......................... 201910245109.4

(51) Int. Cl.
*H04L 29/06* (2006.01)
*G06F 21/64* (2013.01)
*H04L 9/40* (2022.01)

(52) U.S. Cl.
CPC .......... *G06F 21/64* (2013.01); *H04L 63/0853* (2013.01); *H04L 63/105* (2013.01); *G06F 2221/2141* (2013.01)

(58) Field of Classification Search
CPC ............. G06F 21/64; G06F 2221/2141; H04L 63/0853; H04L 63/105; H04L 63/08;
(Continued)

(56) References Cited

U.S. PATENT DOCUMENTS

2016/0085955 A1  3/2016 Lerner
2019/0014116 A1  1/2019 Khi et al.
(Continued)

FOREIGN PATENT DOCUMENTS

CN  106603698 A  4/2017
CN  106656942 A  5/2017
(Continued)

OTHER PUBLICATIONS

Tencent Technology, WO, PCT/CN2020/081526, Jun. 19, 2020, 5 pgs.
(Continued)

*Primary Examiner* — Tri M Tran
(74) *Attorney, Agent, or Firm* — Morgan, Lewis & Bockius LLP

(57) ABSTRACT

Embodiments of this application disclose a permission verification method, and related apparatuses. In the embodiments of this application, a permission operation request is received by a first node device in a blockchain from a client,
(Continued)

and the permission operation request is forwarded to a second node device in the blockchain; a first contract execution result is obtained according to the permission operation request; a second contract execution result broadcasted by the second node device is received based on the permission operation request; and the user permission verification is determined to succeed in a case that the first contract execution result is consistent with the second contract execution result. This solution implements decentralized permission verification based on a blockchain permission management contract system, thereby improving the data security.

20 Claims, 10 Drawing Sheets

(58) Field of Classification Search
CPC ... H04L 63/107; H04L 43/106; H04L 67/535; H04L 2463/121; H04L 9/50; H04L 63/10; H04L 63/101; H04L 63/12; H04L 67/104; H04L 9/32; H04W 4/025; H04W 12/069; H04W 4/023; H04W 12/068; H04W 4/029
USPC ............................................................ 726/4
See application file for complete search history.

(56) References Cited

U.S. PATENT DOCUMENTS

| | | | |
|---|---|---|---|
| 2019/0238525 A1* | 8/2019 | Padmanabhan | ....... H04L 63/101 |
| 2019/0253257 A1* | 8/2019 | Yan | ......................... G06F 16/27 |

FOREIGN PATENT DOCUMENTS

| | | | | |
|---|---|---|---|---|
| CN | 106992990 A | | 7/2017 | |
| CN | 107579865 A | | 1/2018 | |
| CN | 107911373 A | | 4/2018 | |
| CN | 108632268 A | | 10/2018 | |
| CN | 109450685 A | | 3/2019 | |
| CN | 109522735 A | | 3/2019 | |
| CN | 109714348 A | * | 5/2019 | |
| CN | 110032865 A | | 7/2019 | |
| CN | 110598394 A | | 12/2019 | |
| TW | I 646487 B | | 1/2019 | |

OTHER PUBLICATIONS

Tencent Technology, IPRP, PCT/CN2020/081526, Sep. 28, 2021, 6 pgs.

Tencent Technology, ISR, PCT/CN2020/081526, Jun. 19, 2020, 3 pgs.

* cited by examiner

PERMISSION MANAGEMENT METHOD, PERMISSION VERIFICATION METHOD, AND RELATED APPARATUS

CROSS REFERENCE TO RELATED APPLICATIONS

This application is a continuation application of PCT Patent Application No. PCT/CN2020/081526, entitled "PERMISSION MANAGEMENT METHOD, PERMISSION VALIDATION METHOD AND RELATED APPARATUSES" filed on Mar. 27, 2020, which claims priority to Chinese Patent Application No. 201910245109.4, filed with the State Intellectual Property Office of the People's Republic of China on Mar. 28, 2019, and entitled "PERMISSION MANAGEMENT METHOD AND APPARATUS, AND STORAGE MEDIUM", all of which are incorporated herein by reference in their entirety.

FIELD OF THE TECHNOLOGY

This application relates to the field of computer technologies, and specifically, to a permission management technology and a permission verification technology.

BACKGROUND OF THE DISCLOSURE

Currently, conventional user permission management methods are all in a centralized management manner, different permissions are given to different roles, and administrative permissions are excessively centralized.

SUMMARY

Embodiments of this application provide a permission management method, a permission verification method, and related apparatuses, which can improve data security.

According to one aspect, an embodiment of this application provides a permission verification method, performed by a first node device in a blockchain, the method including:
  receiving a permission operation request from a client;
  forwarding the permission operation request to a second node device in the blockchain, the second node device being a node device in the blockchain other than the first node device;
  obtaining a first contract execution result according to the permission operation request;
  receiving a second contract execution result broadcasted by the second node device based on the permission operation request; and
  determining that user permission verification succeeds in a case that the first contract execution result is consistent with the second contract execution result.

According to one aspect, an embodiment of this application provides a permission verification apparatus, integrated in a first node device in a blockchain, the apparatus including:
  a first receiving unit, configured to receive a permission operation request from a client, and forward the permission operation request to a second node device in the blockchain, the second node device being a node device in the blockchain other than the first node device;
  a determining unit, configured to obtain a first contract execution result according to the permission operation request;
  a second receiving unit, configured to receive a second contract execution result broadcasted by the second node device based on the permission operation request; and
  a trigger unit, configured to determine that user permission verification succeeds in a case that the first contract execution result is consistent with the second contract execution result.

According to one aspect, an embodiment of this application provides a computer device, including:
  a processor, a communication interface, a memory, and a communication bus,
  the processor, the communication interface, and the memory communicating with each other by using the communication bus; and the communication interface being an interface of a communication module;
  the memory being configured to store program code and transmit the program code to the processor; and
  the processor being configured to call instructions of the program code in the memory to perform the permission management method or the permission verification method.

According to one aspect, an embodiment of this application provides a non-transitory computer-readable storage medium, configured to store a plurality of computer programs, the computer programs being configured to perform the permission verification method.

According to one aspect, an embodiment of this application provides a computer program product including instructions, the instructions, when run on a computer, causing the computer to perform the permission verification method.

The embodiments of this application provide the permission management method and the permission verification method that are performed by a first node device in a blockchain, and the related apparatuses. Specifically, the method includes: receiving a permission operation request from a client (e.g., at a terminal device), and forwarding the permission operation request to a second node device in the blockchain, the second node device being a node device in the blockchain other than the first node device; obtaining a first contract execution result according to the permission operation request; receiving a second contract execution result broadcasted by the second node device based on the permission operation request; and triggering the first contract execution result to be valid in a case that the first contract execution result is consistent with the second contract execution result. This solution can implement decentralized permission management based on a blockchain permission management contract system, to compare the first contract execution result of the node device with the received second contract execution result, and trigger the first contract execution result to be valid after consensus is reached when a contract execution result of the node device is consistent with contract execution results of other node devices, thereby improving the security of permissions and data.

BRIEF DESCRIPTION OF THE DRAWINGS

To describe the technical solutions in the embodiments of this application or in the existing technology more clearly, the following briefly describes the accompanying drawings required for describing the embodiments or the existing technology. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

Figure 1:
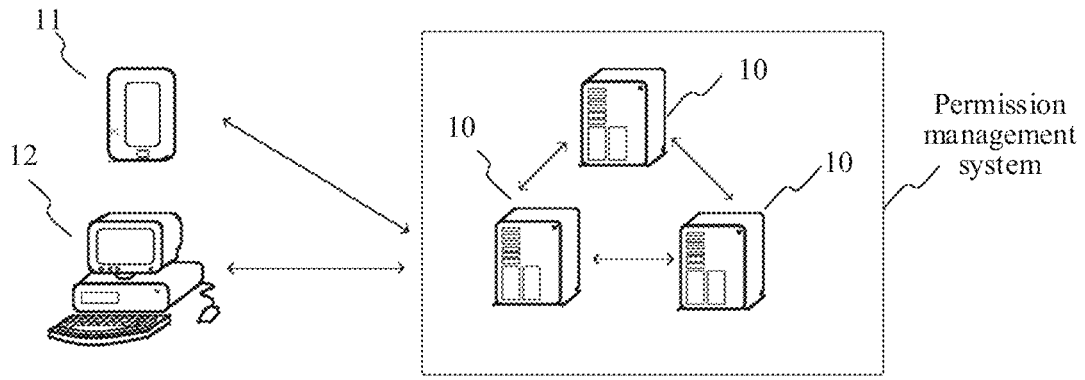
FIG. 1 is a schematic diagram of a scenario of a permission management method according to an embodiment of this application.

The technical solutions in the embodiments of this application are clearly described below with reference to the accompanying drawings in the embodiments of this application. Apparently, the described embodiments are merely some embodiments of this application rather than all of the embodiments. All other embodiments obtained by a person skilled in the art based on the embodiments of this application without creative efforts shall fall within the protection scope of this application.

Before the embodiments of this application are explained and described in detail, some terms involved in the embodiments of this application are explained and described first.

Permission management: management operations related to permissions in a blockchain system, including, for example, user permission operations, user role operations, and the like in the blockchain system. For example, the management operations include operations such as permission verification, permission transfer, permission entrustment, role assignment, and permission assignment.

Blockchain: the blockchain technology is derived from the Bitcoin technology, is an underlying technology of Bitcoin, and is a decentralized distributed ledger database. The blockchain is a string of data blocks (that is, blocks) generated through association by using a cryptographic algorithm, and each data block includes information that is effectively confirmed by a plurality of blockchain network transactions. Based on this, cheating cannot be performed by tampering with data on the blocks, so that it can be ensured that data on any block is open and the data security is ensured.

The blockchain may be classified into a public blockchain, a private blockchain, a consortium blockchain. The consortium blockchain is between the public blockchain and the private blockchain. Several organizations work together to maintain one blockchain, and use of the blockchain needs to be managed with permissions, so that related information is protected, and the organizations are typically, for example, financial organizations.

In conclusion, the blockchain is a distributed database system in which nodes participate, or may be referred to as a distributed public ledger based on a peer-to-peer (P2P) network. Features of the blockchain are unchangeable and unforgeable, and the blockchain may also be understood as a ledger system.

Node device of blockchain: node devices participating in construction of a blockchain, the node devices may be an execution subject of permission management, and services such as transactions may be implemented through interactions between the node devices. The node device stores related block data, for example, a permission management contract and a blockchain contract ledger.

The following describes a permission management method and apparatus and a storage medium according to the embodiments of this application. The permission management apparatus may be integrated in a node device of a blockchain, and the node device may be a network device such as a server.

Referring to FIG. 1, an embodiment of this application provides a blockchain-based permission management system. The system may implement permission management and other services such as electronic bill management. The system may include a plurality of node devices 10, where the plurality of node devices are connected through a network.

Each node device 10 may be configured to manage user permissions in the system, or may be used as an accounting node in a blockchain, to store transaction information in a transaction process, and update the transaction information regularly, so that other nodes in the implementation environment may share the transaction information, so that the nodes may provide a certificate of conformity for the transaction information, thereby improving the security of the transaction information. For example, when a permission operation process is completed, the accounting node may share the transaction information to blockchains of the nodes according to node identifiers (such as network addresses) of the nodes.

In a permission management scenario, the node device may receive a permission operation request transmitted by a requesting device such as user equipment like a mobile phone 11, a computer 12, or another node device 10, and forward the permission operation request to a second node device 10 in the blockchain, the second node device being a node device 10 in the blockchain other than the first node device 10; determine a to-be-operated permission operation type according to the permission operation request; perform validation logic corresponding to the permission operation type based on a permission management contract; perform, in a case that the validation succeeds, a permission operation corresponding to the permission operation type, to obtain a first contract execution result; receive a second contract execution result broadcasted by the second node device 10 based on the permission operation request; and trigger the first contract execution result to be valid in a case that the first contract execution result is consistent with the second contract execution result.

Detailed descriptions are separately provided below. A description order of the following embodiments is not intended to limit preference orders of the embodiments.

This embodiment is described from the perspective of a permission management apparatus. The permission management apparatus may be integrated in a node device in a blockchain, where the node device may be a network device such as a data processing device, and the data processing device may be a terminal device. The terminal device, for example, may be a device such as a smartphone, a computer, a personal digital assistant (PDA), a tablet computer, a point of sales (POS), or an on-board computer. The data processing device may be a server, and the server may be an independent server or may be a server in a cluster.

Figure 2:
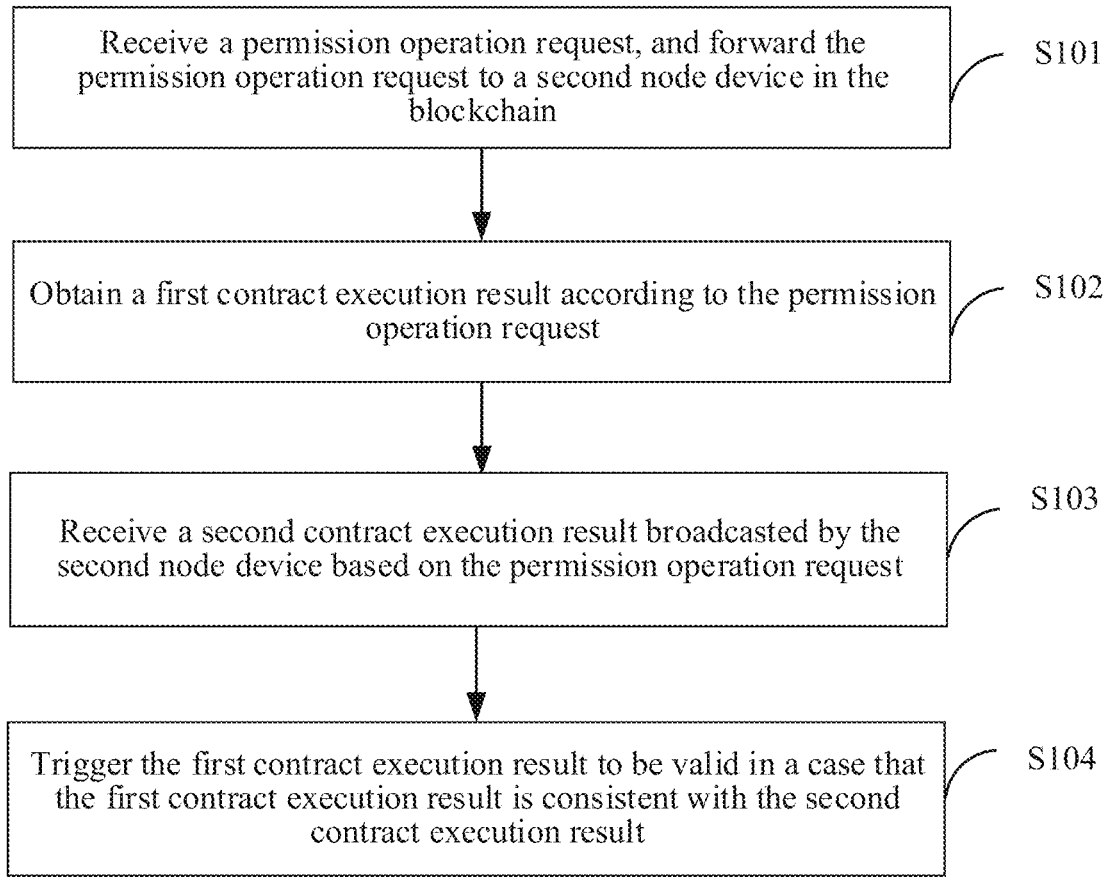
FIG. 2 is a flowchart of a permission management method according to an embodiment of this application.

An embodiment of this application provides a permission management method, and the method may be performed by a processor of a first node device in a blockchain. As shown in FIG. 2, a specific process of the permission management method may be as follows:

S101. Receive a permission operation request from a client, and forward the permission operation request to a second node device in the blockchain.

The permission operation request may carry information such as a requesting user identifier or permission operation information. For example, the permission operation information may include a permission operation type.

The permission operation request may be transmitted by a requesting device in a blockchain system, and the requesting device may include a terminal in the system or another node device such as a server.

The second node device is a node device in the blockchain system other than the first node device. In the embodiments of this application, when one node device in the blockchain receives a permission operation request from a client, the node device needs to forward, for example, broadcast, the request to another node device in the blockchain, so that the another device performs a corresponding permission operation and validation thereof.

For example, when a permission operation needs to be performed, a requesting user may transmit a permission operation request to the first node device through a terminal. In this case, the first node device may receive the request, and forward the permission operation request to the second node device.

In an embodiment, the permission operation request may be triggered by the node device. For example, when a contract transaction request is received, a permission operation request may be triggered according to the transaction request, and in this case, the node device may receive the permission operation request. In an embodiment, the permission operation request may further include a transaction request.

S102. Obtain a first contract execution result according to the permission operation request.

Figure 3A:
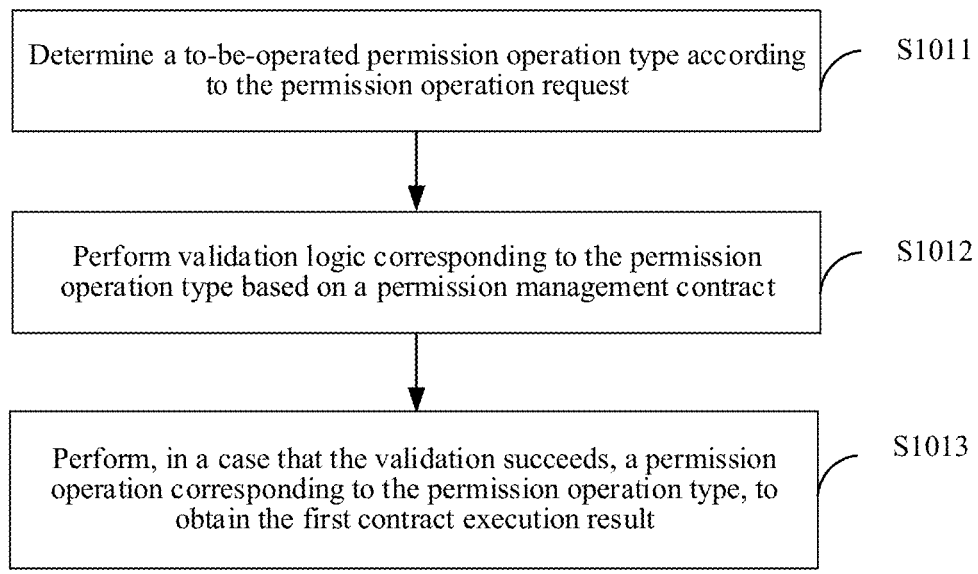
FIG. 3a is a method flowchart of obtaining a first contract execution result according to an embodiment of this application.

The manner in which the first contract execution result is obtained according to the permission operation request is not limited in the embodiments of this application. The first contract execution result may be selected in a suitable manner according to actual situations or different requirements. In a possible implementation, FIG. 3a shows a method flowchart of obtaining a first contract execution result according to an embodiment of this application, and the method of S102 may include the following steps:

S1011. Determine a to-be-operated permission operation type according to the permission operation request.

The permission operation type may be divided according to actual requirements. For example, the permission operation type may include: permission assignment (for example, assigning permissions to users or user roles), permission transfer, permission proxy, permission verification, and the like. In an embodiment, the permission operation type may further include user role operations such as role assignment, role proxy (for example, entrusting another user with a proxy role), and proxy role withdrawal (for example, withdrawing the proxy role entrusted to another user).

It may be understood that: division of the permission operation type is not limited the permission type division described above, but may be another permission type division. For example, the permission operation type may be divided into an administrator permission operation, a common user permission operation, and the like. In another example, division may be performed based on permission levels, and the permission operation type may be divided into a low-level permission operation, a medium-level permission operation, and a high-level permission operation. In another example, division may be performed based on security of a permission operation, and the permission operation type may be divided into a normal permission operation, a high-risk permission operation, and the like.

In the embodiments of this application, there may be a plurality of manners for determining a permission type. For example, in an embodiment, the permission operation request may carry permission operation information (for example, a permission operation type identifier), and in this case, the permission type may be determined according to the permission operation information. In another example, when the permission operation request alternatively carries permission operation content, recognition may be performed on the permission operation content, to determine the permission type.

S1012. Perform validation logic corresponding to the permission operation type based on a permission management contract.

The permission management contract is a set of permission management agreements that are defined, spread, verified, or performed in a digital form and includes a protocol on which contract participants may perform the agreements. A smart contract permits trusted transactions to be performed without a third party, and these transactions are traceable and irreversible.

In the embodiments of this application, each node device in the blockchain is deployed with or stores the permission management contract, to implement illegal tampering of the permission management contract. The permission management contract may be stored in a plurality of manners. For example, in an embodiment, the permission management contract may be stored by using a blockchain to replace a conventional manner of using a relational database, thereby improving tamper resistance of permissions. In this case, data corresponding to the permission management contract may be stored in a blockchain contract ledger. The blockchain contract ledger is a distributed ledger. The blockchain contract ledger may include related data recording the permission management contract, and may protect the data from being tampered with or lost.

Figure 3B:
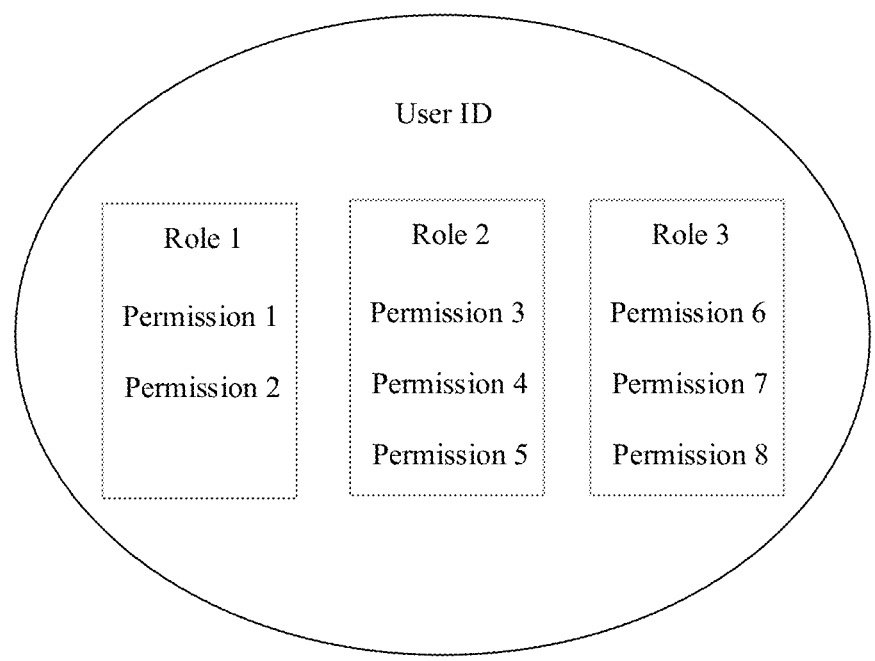
FIG. 3b is a schematic diagram of a mapping relationship according to an embodiment of this application.

In an embodiment, the data of the permission management contract may include a mapping relationship between a user, a role, and permissions. For example, FIG. 3b shows a mapping diagram of a user identity document (ID), roles, and permissions. The user ID may correspond to a plurality of roles, and one role may correspond to a plurality of permissions. Different roles may have the same permission.

In actual application, the permission management contract may be triggered by a service such as a contract transaction that meets a condition in the blockchain, and performed by a blockchain virtual machine, where the blockchain virtual machine is implemented by a node device.

In the embodiments of this application, the permission management contract may further include validation logic corresponding to the permission operation type, and the validation logic may be configured according to an actual requirement. Each permission operation type may correspond to one type of validation logic. For example, if a current permission operation type is a, validation logic a' corresponding to the permission type a may be performed.

Specifically, to improve the data security, the validation logic corresponding to the permission operation type may include: verification on operation legality of a requesting user and verification on an operation object corresponding to the permission operation type. For example, for S1012, the performing validation logic corresponding to the permission operation type based on a permission management contract may include:

(1) Perform verification on operation legality of a request initiating user based on the permission management contract.

The verification on the operation legality of the request initiating user may be set according to an actual requirement. For example, in an embodiment, the verification may include: verifying whether an identity of the request initiating user is legal and whether the request initiating user has a corresponding function permission, and the like For example, the "performing verification on operation legality of a request initiating user based on the permission management contract" may include: performing verification on an operation parameter based on the permission management contract; and determining that an operation of request initiating user is legal in a case that the verification succeeds; otherwise, determining that the operation is illegal. The operation parameter includes one or a combination of a call parameter, and a function permission and a signature of the request initiating user. For example, the following manners may be included:

(1.1) Perform verification on a function permission and a signature of the request initiating user based on the permission management contract; and determine that an operation of the request initiating user is legal in a case that the verification on the function permission and the signature of the request initiating user succeeds; otherwise, determine that the operation of the request initiating user is illegal.

For example, verification may be first performed on the function permission of the request initiating user; when the verification on the function permission succeeds, verification is performed on the signature of the request initiating user; and when the verification on the signature succeeds, it is determined that the operation of the request initiating user is legal.

The verification on the function permission includes verifying whether the request initiating user has a function permission of the operation corresponding to the permission operation type. For example, when the permission operation type is permission assignment, whether the request initiating user has a function permission of assigning permissions needs to be verified; and when the permission operation type is role assignment, whether the request initiating user has a function permission of assigning roles needs to be verified.

In another example, when the permission operation type is super permission transfer, whether the request initiating user has an administrator permission needs to be verified.

In an embodiment, the process of performing verification on the function permission of the request initiating user based on the permission management contract may be as follows:

obtaining a role token set of the request initiating user from a blockchain contract ledger based on the permission management contract;

determining that the verification on the function permission succeeds in a case that function permissions corresponding to role tokens in the role token set include a target function permission required by the permission operation type;

obtaining a proxy role token set surrogated by the request initiating user from the blockchain contract ledger in a case that the function permissions corresponding to all the role tokens in the role token set do not include the target function permission required by the permission operation type; and determining that the verification on the function permission succeeds in a case that function permissions corresponding to proxy role tokens in a proxy role token set include a target function permission required by the permission operation type; otherwise, determining that the verification on the function permission fails.

(1.2) Perform verification on a signature of the request initiating user based on the permission management contract; and determine that an operation of the request initiating user is legal in a case that the verification on the signature of the request initiating user succeeds; otherwise, determine that the operation of the request initiating user is illegal.

The signature of the request initiating user is a digital signature in the blockchain, to ensure that data cannot be tampered with in the entire system, and ensure that identities of both transaction parties are real and reliable. The digital signature uses an asymmetric encryption technology and a digital digest technology, to ensure integrity of data in a transmission process and that an identity of a sender is real and cannot be faked. The asymmetric encryption technology generates a public key and a private key, and the public key and the private key are one pair. The private key is stored by an owner, and needs to be kept as a secret and cannot be known by others. The public key may be open to other information receiving parties. Data encrypted by using a private key can only be decrypted by a public key, and on the contrary, data encrypted by using a public key can only be decrypted by using a corresponding private key.

The digital digest is to change information with any length to information with a fixed length by using a hash function. The hash function is a one-way generation system, which means that an input value cannot be reversely generated by using a generated hash value. In addition, the hash function is a contraction mapping and outputs information with a fixed length.

(1.3) Perform verification on a call parameter and a signature of the request initiating user based on the permission management contract; and determine that an operation of the request initiating user is legal in a case that the verification on the call parameter and the signature of the request initiating user succeeds; otherwise, determine that the operation of the request initiating user is illegal.

The call parameter may include a parameter needing to be called when the permission management contract is performed, such as a called interface parameter. The parameter to be specifically verified may be set according to an actual requirement.

(2) Perform, in a case that an operation of the request initiating user is legal, verification on permission information of an operation object corresponding to the permission operation type.

The operation object is a target at which the permission operation corresponding to the permission operation type aims, and the target may include a user, a role, or the like. For example, when the permission operation type is permission assignment, the operation object is a user to which a permission is to be assigned. In another example, when the permission operation type is role assignment, the operation object may be a user to which a role is to be assigned.

The permission information of the operation object may correspond to the permission operation type, and specific logic of verification on the permission information of the operation object is determined according to the permission operation type. Permission information verification corresponding to each permission type is described below:

(2.1) The permission operation type includes permission assignment.

For example, an administrator assigns a permission to a role of a user.

The operation object may include a role to which a permission is to be assigned, namely, a to-be-assigned role.

The verification on the permission information of the operation object includes: obtaining, in a case that the operation of the request initiating user is legal, an assigned function permission set corresponding to the to-be-assigned role from a blockchain contract ledger, the blockchain contract ledger including a mapping relationship between a user, a role, and assigned function permissions; and determining that the verification on the permission information succeeds in a case that the assigned function permission set does not include a to-be-assigned permission.

That is, when a permission needs to be assigned, whether the to-be-assigned user has had the to-be-assigned function permission needs to be verified, and it is permitted to assign the permission to the user if it is determined that the verification on the permission information of the to-be-assigned user succeeds; otherwise, it is rejected to assign the permission to the user.

(2.2) The permission operation type includes role assignment.

For example, an administrator assigns a role to a user.

The operation object may include a user to which a role is to be assigned, namely, a to-be-assigned user.

The verification on the permission information of the operation object may include: assigning a role token to the to-be-assigned user based on the permission management contract in a case that the operation of the request initiating user is legal;

obtaining a role token set corresponding to the to-be-assigned user from a blockchain contract ledger; and determining that the verification on the permission information succeeds in a case that the role token set does not include the to-be-assigned role token.

That is, when a role is assigned to the user, whether the to-be-assigned user has had the role needs to be verified, and it is permitted to assign the role to the user if it is determined that the verification on the permission information of the to-be-assigned user succeeds; otherwise, it is rejected to assign the role to the user.

(2.3) The permission operation type includes permission transfer.

For example, an administrator transfers a super permission to a new administrator.

The operation object may include a user to which the permission is to be transferred, namely, a to-be-transferred user.

Identity legality of the to-be-transferred user is checked in a case that the operation of the request initiating user is legal.

It is determined that the verification on the permission information succeeds in a case that an identity of the to-be-transferred user is legal.

That is, during permission transfer, whether the identity of the to-be-transferred user is legal needs to be verified, and it is permitted to transfer the permission to the user if it is determined that the verification on the permission information of the to-be-transferred user succeeds; otherwise, it is rejected to transfer the permission.

(2.4) The permission operation type includes role entrustment proxy.

For example, a user entrusts another user to surrogate a role temporarily or in a specific time period.

The operation object may include a user to which a role is to be entrusted, namely, a to-be-entrusted user.

The verification on the permission information may include: checking identity legality of the to-be-entrusted user in a case that the operation of the request initiating user is legal; checking roles of the request initiating user and the to-be-entrusted user based on a to-be-entrusted role in a case that an identity of the to-be-entrusted user is legal; obtaining a surrogated role of the to-be-entrusted user from a blockchain contract ledger in a case of checking that the request initiating user has the to-be-entrusted role and the to-be-entrusted user does not have the to-be-entrusted role; and determining that the verification on the permission information succeeds in a case that the surrogated role does not include the to-be-entrusted role.

Specifically, whether the request initiating user has the to-be-entrusted role may be checked; if the request initiating user has the to-be-entrusted role, whether the to-be-entrusted user has the to-be-entrusted role is checked; if the to-be-entrusted user does not have the to-be-entrusted role, the blockchain contract ledger is queried for a state of a surrogated role of the to-be-entrusted user; whether the to-be-entrusted user has surrogated the to-be-entrusted role is determined based on the state of the surrogated role; and it is determined that the verification on the permission information succeeds if the to-be-entrusted user has not surrogated the to-be-entrusted role.

That is, when another user is entrusted to surrogate a role, whether the entrusting user has the role and whether the to-be-entrusted user does not have the role need to be verified, and it is determined that the verification on the permission information succeeds if the entrusting user has the role and the to-be-entrusted user does not have the role; otherwise, it is rejected to entrust the role.

(2.5) The permission operation type includes role entrustment withdrawal.

For example, a user withdraws a role entrusted to another user to surrogate.

The operation object may include a user of which the entrusted proxy role needs to be withdrawn, namely, a proxy user.

The verification on the permission information may include: checking, in a case that the operation of the request initiating user is legal, whether the request initiating user has a to-be-withdrawn role token; obtaining a proxy role token set of the proxy user from a blockchain contract ledger if there is a to-be-withdrawn role token; and determining that the verification on the permission information succeeds in a case that the proxy role token set includes the to-be-withdrawn role token.

That is, when the request initiating user has the to-be-withdrawn role and the proxy user has the to-be-withdrawn role, it is determined that the verification succeeds and it is permitted to withdraw the role; otherwise, it is rejected to withdraw the role.

(2.6) The permission operation type includes permission verification.

For example, a system verifies a function permission of a user, such as verifies a function permission of the request initiating user.

The operation object may include a user of which a function permission is to be verified, namely, a to-be-verified user, such as the request initiating user.

The verification on the permission information may include: obtaining a role token set of the to-be-verified user from a blockchain contract ledger based on the permission management contract;

determining that the verification on the function permission succeeds in a case that function permissions corresponding to role tokens in the role token set include a target function permission required by the permission operation type;

obtaining a proxy role token set surrogated by the to-be-verified user from the blockchain contract ledger in a case that the function permissions corresponding to all the role tokens in the role token set do not include the target function permission required by the permission operation type; and determining that the verification on the function permission succeeds in a case that function permissions corresponding to proxy role tokens in a proxy role token set include a target function permission required by the permission operation type; otherwise, determining that the verification on the function permission fails.

Validation logic of several permission operation types is described above, and it is not limited to the foregoing validation logic in actual application.

In the embodiments of this application, after obtaining a first verification result in the foregoing process, the first node device may broadcast the first verification result to the second node device in the blockchain. For example, the verification result may be broadcasted after the verification result is signed, namely, after a signature is added to the verification result. The first verification result may include content that the verification succeeds or fails.

S1013. Perform, in a case that the validation succeeds, a permission operation corresponding to the permission operation type, to obtain the first contract execution result.

The first contract execution result may include a permission operation result, such as a result that the permission operation succeeds or the permission operation fails. In an embodiment, the first contract execution result may further include change result data brought by the permission operation. For example, during permission assignment, a permission set to which a function permission has been added may be included, or during role assignment, a role token set to which a role has been added may be included.

For the node device, related permission operations such as the validation logic and the permission operation are all performed under the permission management contract. Therefore, when a permission operation is performed, it may be considered that a result generated when the execution of the contract ends may become a contract execution result.

In the embodiments of this application, when the verification succeeds, permission operations, such as permission assignment, verification, and role assignment corresponding to the permission operation type, may be performed first. In this case, the contract execution result does not come into effect. For example, the first contract execution result may be written into a cache such as a contract cache.

For example, in a case that the permission type is permission assignment, when the verification succeeds, the to-be-assigned permission may be added to an assigned function permission set corresponding to the to-be-assigned role.

In another example, in a case that the permission type is role assignment, when the verification succeeds, the to-be-assigned role token may be added to the role token set corresponding to the to-be-assigned user.

In another example, in a case that the permission type is permission transfer, when the verification succeeds, a user of a to-be-transferred permission is updated to the to-be-transferred user.

In another example, in a case that the permission type is role entrustment proxy, when the verification succeeds, the to-be-entrusted role is added as the surrogated role of the to-be-entrusted user.

In an embodiment, when the surrogated role does not include the to-be-entrusted role, proxy information, such as registration and a term of validity, of the to-be-entrusted role may be updated.

In another example, in a case that the permission type is role entrustment withdrawal, when the verification succeeds, the to-be-withdrawn role token is withdrawn from the proxy role token set of the proxy user.

In an embodiment, when the verification fails, a contract execution result of a permission operation failure may be returned, or a contract execution result of denial of service may be returned, which may be specifically set according to an actual requirement.

S103. Receive a second contract execution result broadcasted by the second node device based on the permission operation request.

After another node device, namely, the second node device in the blockchain, receives the broadcasted permission operation request, the second node device may perform validation and permission operation processes same as or similar to those of the first node device in the same permission management contract, such as determining a permission operation type and executing validation logic corresponding to the permission operation type. When the verification succeeds, a corresponding contract execution result (for example, the permission operation succeeds or fails, the permission operation is permitted or rejected, or the like) is obtained, the contract execution result obtained by the second node device is referred to as a second contract execution result, and the contract execution result may be broadcasted to node devices in the blockchain other than the second node device after the second contract execution result is obtained.

In the embodiments of this application, a quantity of the second contract execution results is the same as that of the second node devices. For example, when there are a plurality of second node devices, a plurality of second contract execution results may be received.

S104. Trigger the first contract execution result to be valid in a case that the first contract execution result is consistent with the second contract execution result.

After one node device in the blockchain receives a second contract execution result broadcasted by another node device, the node device may compare a first contract execution result of the node device with the received second contract execution result, reach consensus when the contract execution result of the node device is consistent with the contract execution result of the another node device, and trigger the first contract execution result to be valid when both the permission operations succeed.

The triggering the first contract execution result to be valid means making the permission operation corresponding to the permission operation type to be valid. For example, the blockchain contract ledger may be updated based on the first contract execution result, and when the first contract execution result includes permission operation result data or change data brought by the permission operation, the permission operation result data or the change data may be written into the blockchain contract ledger, to make the first contract execution result to be valid.

In an embodiment, the permission operation corresponding to the permission operation type may be performed, and first contract execution result data may be written into a cache such as a contract cache; and when the first contract execution result is consistent with the second contract execution result, the blockchain contract ledger is updated based on the data in the cache. For example, the contract cache data is written into the blockchain contract ledger, to make the first contract execution result to be valid.

For example, in a case that the permission type is permission assignment, when verification on a node device (for example, the first node device) on this end succeeds, the to-be-assigned permission is added to the assigned function permission set corresponding to the to-be-assigned role, to obtain permission assignment result data, and the permission assignment result data may be written into the contract cache. When the node device on this end reaches consensus with a contract execution result of another node device (for example, the second node device), the contract cache data is written into the blockchain contract ledger, to update the ledger, so as to trigger the permission assignment operation to be valid.

In another example, in a case that the permission type is role assignment, when verification on a node device (for example, the first node device) on this end succeeds, the to-be-assigned role token is added to the role token set corresponding to the to-be-assigned user, to obtain role assignment result data, and the role assignment result data may be written into the contract cache. When the node device on this end reaches consensus with a contract execution result of another node device (for example, the second node device), the contract cache data is written into the blockchain contract ledger, to update the ledger, so as to trigger the role assignment operation to be valid.

In another example, in a case that the permission type is permission transfer, when verification on a node device (for example, the first node device) on this end succeeds, the user of the to-be-transferred permission is updated to the to-be-transferred user, to obtain permission transfer result data, and the permission transfer result data may be written into the contract cache. When the node device on this end reaches consensus with a contract execution result of another node device (for example, the second node device), the contract cache data is written into the blockchain contract ledger, to update the ledger, so as to trigger the permission transfer operation to be valid.

In another example, in a case that the permission type is role entrustment proxy, when verification on a node device (for example, the first node device) on this end succeeds, the to-be-entrusted role is added as the surrogated role of the to-be-entrusted user, to obtain role entrustment proxy result data, and the role entrustment proxy result data may be written into the contract cache. When the node device on this end reaches consensus with a contract execution result of another node device (for example, the second node device), the contract cache data is written into the blockchain contract ledger, to update the ledger, so as to trigger the role entrustment proxy operation to be valid.

In an embodiment, when the surrogated role does not include the to-be-entrusted role, proxy information, such as registration and a term of validity, of the to-be-entrusted role may be updated.

In another example, in a case that the permission type is role entrustment withdrawal, when verification on a node device (for example, the first node device) on this end succeeds, the to-be-withdrawn role token is withdrawn from the proxy role token set of the proxy user, to obtain role entrustment withdrawal result data, and the role entrustment withdrawal result data may be written into the contract cache. When the node device on this end reaches consensus with a contract execution result of another node device (for example, the second node device), the contract cache data is written into the blockchain contract ledger, to update the ledger, so as to trigger the role entrustment withdrawal operation to be valid.

The permission management method provided in the embodiments of this application is applicable to various scenarios, such as a blockchain electronic invoice, blockchain supply chain finance, and Internet evidence storage.

As can be learned from the above, in the permission management solution provided in the embodiments of this application can implement decentralized permission management based on a blockchain permission management contract system. Therefore, the security of permissions and data, such as the security of the permissions and data in a blockchain (for example, a consortium blockchain) can be improved.

Figure 3C:
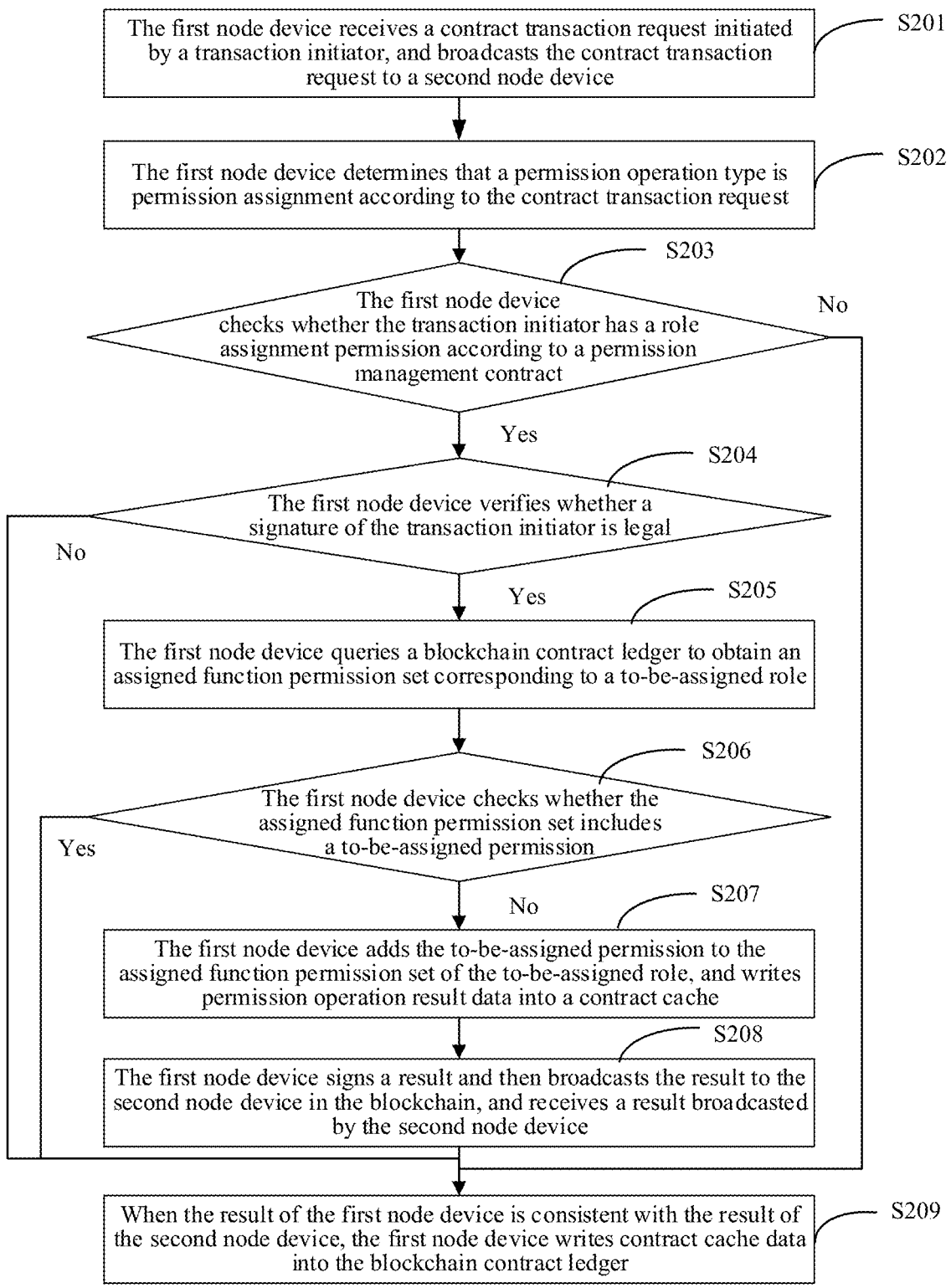
FIG. 3c is a schematic flowchart of permission assignment according to an embodiment of this application.

Based on the descriptions of the foregoing embodiments, several common permission management scenarios are described below:

In an embodiment, a permission assignment method is provided, and the method may be performed by a first node device in a blockchain. Referring to FIG. 3c, a specific process of the method is as follows:

S201. The first node device receives a contract transaction request initiated by a transaction initiator, and broadcasts the contract transaction request to a second node device.

A user, for example, an administrator, may trigger to assign a permission to a role of the user through the transaction by sending the contract transaction request to the first node device in the blockchain through a terminal.

S202. The first node device determines that a permission operation type is permission assignment according to the contract transaction request.

For example, the contract transaction request may carry a permission operation type, and in this case, the permission operation type may be directly determined based on the request.

S203. The first node device checks whether the transaction initiator has a role assignment permission according to a permission management contract, and performs S204 if yes; otherwise, performs S208.

For example, after a blockchain accounting node receives the transaction, a virtual machine is triggered to call the permission management contract.

If the transaction initiator has the role assignment permission, execution of the contract ends, and a contract execution result of operation success is returned.

S204. The first node device verifies whether a signature of the transaction initiator is legal, and performs S205 if yes; otherwise, performs S208.

Specifically, a contract execution result of denial of service is returned when the signature is illegal.

S205. The first node device queries a blockchain contract ledger to obtain an assigned function permission set corresponding to a to-be-assigned role.

S206. The first node device checks whether the assigned function permission set includes a to-be-assigned permission, and performs S208 if yes; otherwise, performs S207.

Specifically, execution of the contract ends when there is no to-be-assigned permission, and a contract execution result of denial of service is returned.

S207. The first node device adds the to-be-assigned permission to the assigned function permission set of the to-be-assigned role, and writes permission operation result data into a contract cache.

In an embodiment, a contract execution result of operation success may be returned after a permission operation is performed completely.

S208. The first node device signs a result and then broadcasts the result to the second node device in the blockchain, and receives a result broadcasted by the second node device.

The result may include a contract execution result (for example, the permission operation succeeds or fails), or a verification result of the permission assignment (for example, the verification succeeds). For example, a contract execution result of this end may be signed and then broadcasted to other node devices in the blockchain.

S209. When the result of the first node device is consistent with the result of the second node device, the first node device writes contract cache data into the blockchain contract ledger.

For example, the blockchain accounting node signs the result and then broadcasts the result, and writes the contract cache data into the blockchain contract ledger after reaching consensus.

Figure 3D:
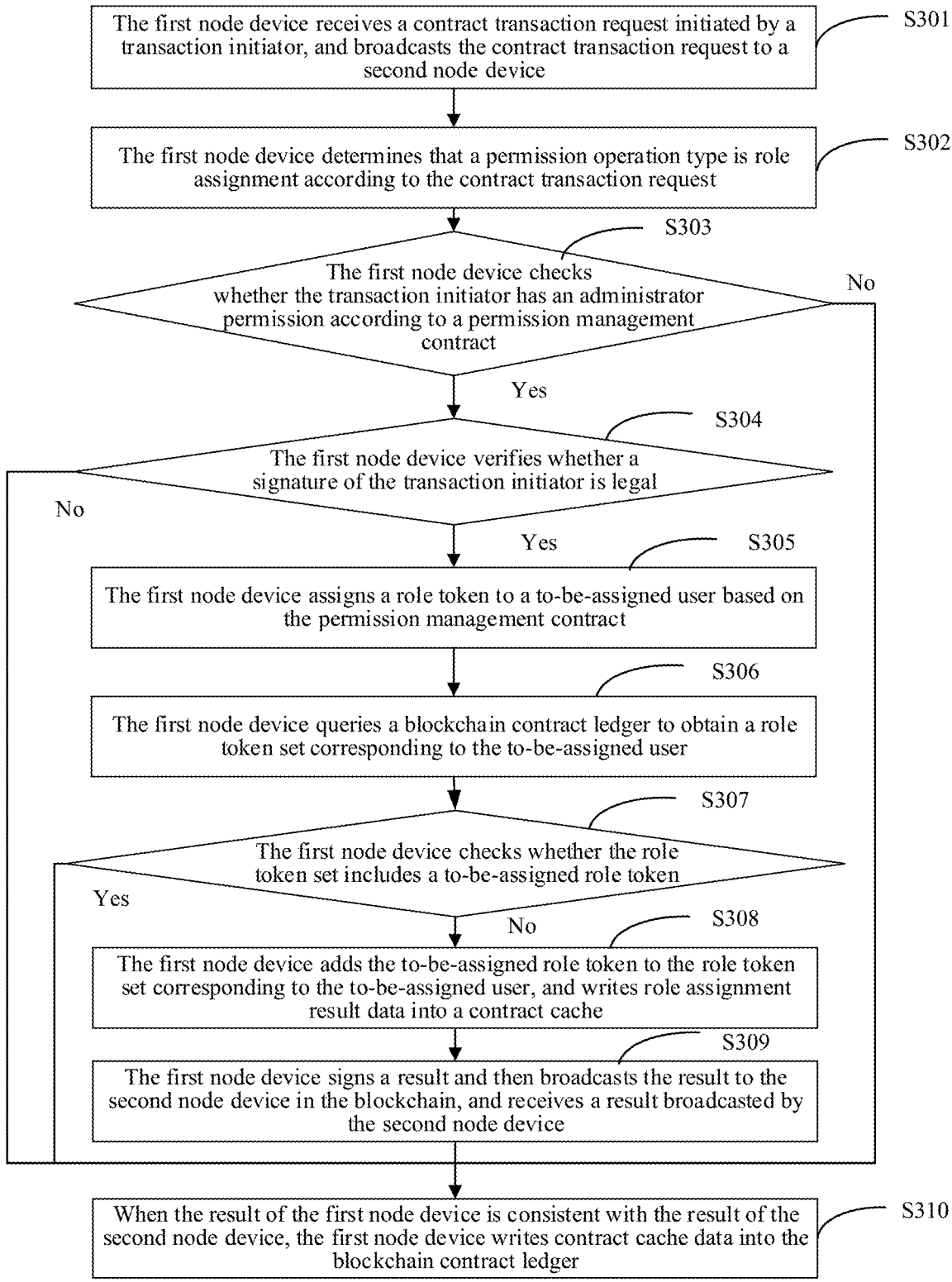
FIG. 3d is a schematic flowchart of role assignment according to an embodiment of this application.

In an embodiment, a role assignment method is provided, and the method may be performed by a first node device in a blockchain. Referring to FIG. 3d, a specific process of the method is as follows:

S301. The first node device receives a contract transaction request initiated by a transaction initiator, and broadcasts the contract transaction request to a second node device.

A user, for example, an administrator, may trigger to assign a role to the user through the transaction by sending the contract transaction request to the first node device in the blockchain through a terminal.

S302. The first node device determines that a permission operation type is role assignment according to the contract transaction request.

For example, the contract transaction request may carry a permission operation type, and in this case, the permission operation type may be directly determined based on the request.

S303. The first node device checks whether the transaction initiator has an administrator permission according to a permission management contract, and performs S304 if yes; otherwise, performs S309.

For example, after a blockchain accounting node receives the transaction, a virtual machine is triggered to call the permission management contract. Generally, the administrator permission is the largest and includes permissions such as role assignment.

If the contract initiator does not have the administrator permission, execution of the contract ends, and a result of denial of service is returned. That is, the verification fails.

S304. The first node device verifies whether a signature of the transaction initiator is legal, and performs S305 if yes; otherwise, performs S309.

Specifically, a contract execution result of denial of service is returned when the signature is illegal.

S305. The first node device assigns a role token to a to-be-assigned user based on the permission management contract.

S306. The first node device queries a blockchain contract ledger to obtain a role token set corresponding to the to-be-assigned user.

S307. The first node device checks whether the role token set includes a to-be-assigned role token, and performs S308 if not; otherwise, performs S309.

S308. The first node device adds the to-be-assigned role token to the role token set corresponding to the to-be-assigned user, and writes role assignment result data into a contract cache.

In an embodiment, a contract execution result of operation success may be returned after a permission operation is performed completely.

S309. The first node device signs a result and then broadcasts the result to the second node device in the blockchain, and receives a result broadcasted by the second node device.

The result may include a contract execution result (for example, the permission operation succeeds or fails), or a verification result of the permission assignment (for example, the verification succeeds). For example, a contract execution result of this end may be signed and then broadcasted to other node devices in the blockchain.

S310. When the result of the first node device is consistent with the result of the second node device, the first node device writes contract cache data into the blockchain contract ledger.

For example, the blockchain accounting node signs the result and then broadcasts the result, and writes the contract cache data into the blockchain contract ledger after reaching consensus.

Figure 4:
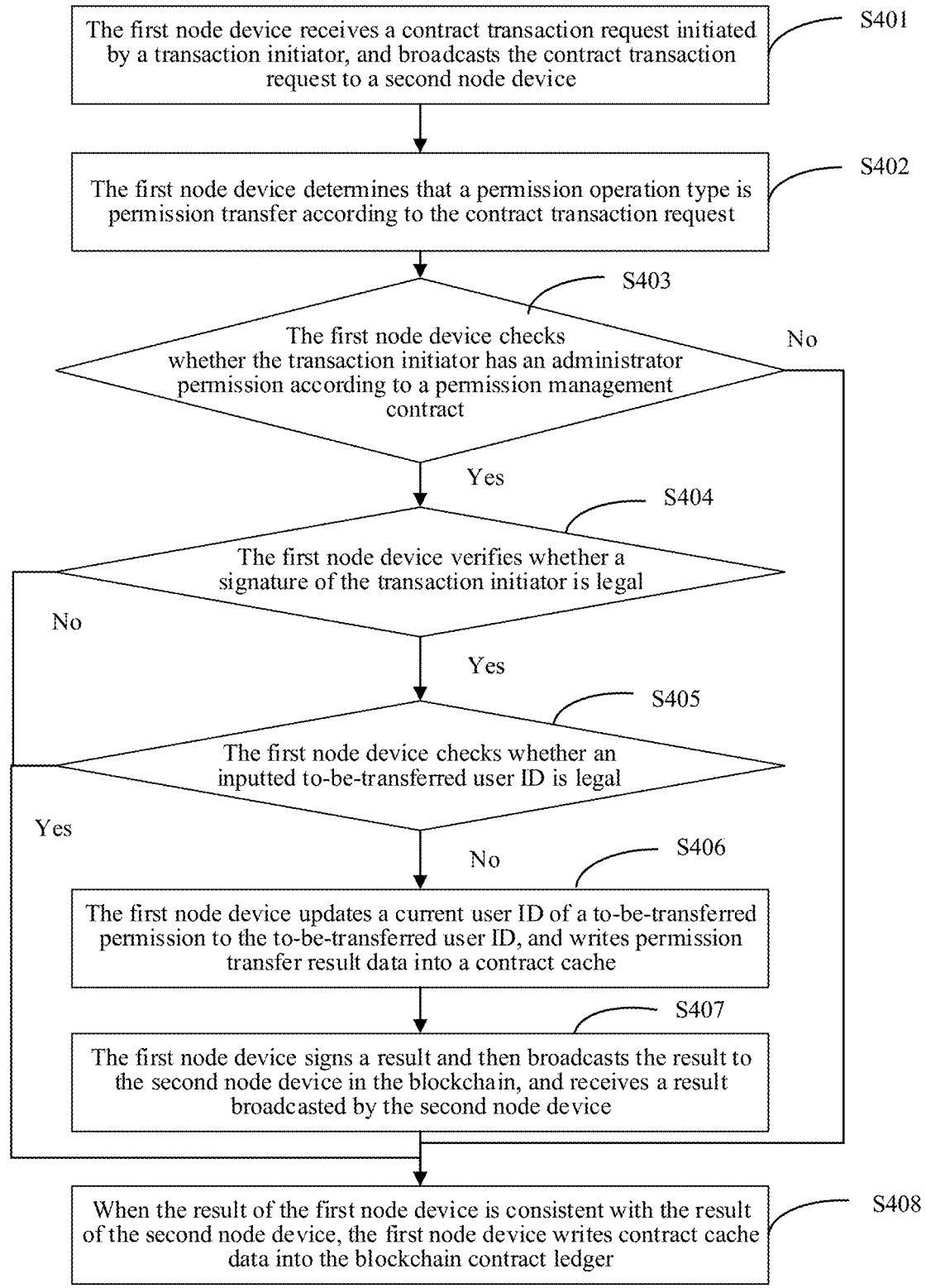
FIG. 4 is a schematic flowchart of permission transfer according to an embodiment of this application.

In an embodiment, a permission transfer method is provided, and the method may be performed by a first node device in a blockchain. Referring to FIG. 4, a specific process of the method is as follows:

S401. The first node device receives a contract transaction request initiated by a transaction initiator, and broadcasts the contract transaction request to a second node device.

A user, for example, an administrator, may trigger to transfer an administrator permission to a new administrator through the transaction by sending the contract transaction request to the first node device in the blockchain through a terminal.

S402. The first node device determines that a permission operation type is permission transfer according to the contract transaction request.

For example, the contract transaction request may carry a permission operation type, and in this case, the permission operation type may be directly determined based on the request.

S403. The first node device checks whether the transaction initiator has an administrator permission according to a permission management contract, and performs S404 if yes; otherwise, performs S407.

For example, after a blockchain accounting node receives the transaction, a virtual machine is triggered to call the permission management contract. Generally, the administrator permission is the largest and includes permissions such as permission transfer.

If the contract initiator does not have the administrator permission, execution of the contract ends, and a result of denial of service is returned.

S404. The first node device verifies whether a signature of the transaction initiator is legal, and performs S405 if yes; otherwise, performs S407.

Specifically, a contract execution result of denial of service is returned when the signature is illegal, and S407 is performed.

S405. The first node device checks whether an inputted to-be-transferred user ID is legal, and performs S406 if yes; otherwise, performs S407.

In an embodiment, when the to-be-transferred user ID is illegal, a contract execution result of denial of service is returned.

S406. The first node device updates a current user ID of a to-be-transferred permission to the to-be-transferred user ID, and writes permission transfer result data into a contract cache.

In an embodiment, a contract execution result of operation success may be returned after a permission operation is performed completely.

S407. The first node device signs a result and then broadcasts the result to the second node device in the blockchain, and receives a result broadcasted by the second node device.

The result may include a contract execution result (for example, the permission operation succeeds or fails), or a verification result of the permission assignment (for example, the verification succeeds). For example, a contract execution result of this end may be signed and then broadcasted to other node devices in the blockchain.

S408. When the result of the first node device is consistent with the result of the second node device, the first node device writes contract cache data into the blockchain contract ledger.

Figure 5:
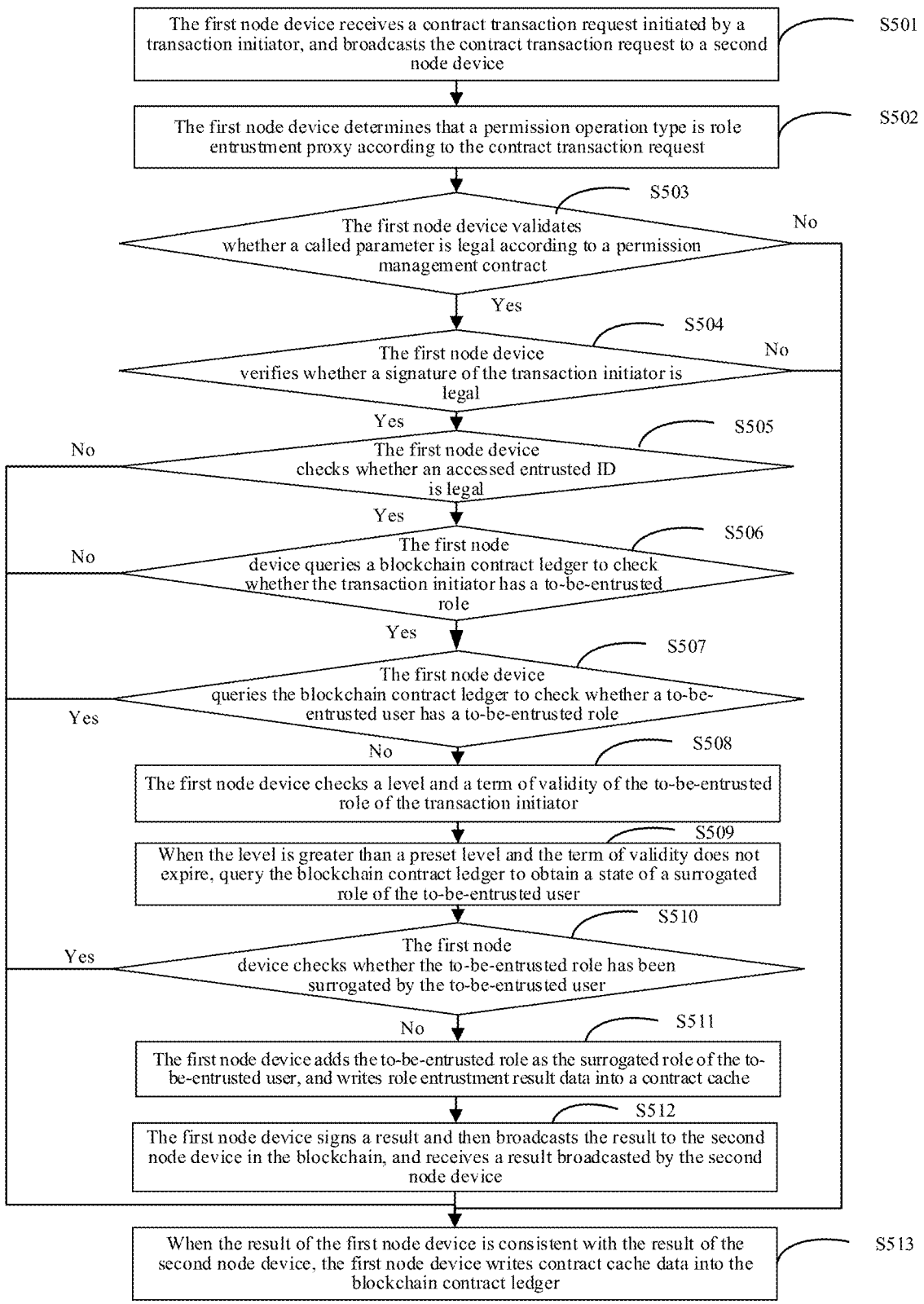
FIG. 5 is a schematic flowchart of entrusting a proxy role according to an embodiment of this application.

In an embodiment, a role entrustment proxy method is provided, and the method may be performed by a first node device in a blockchain. Referring to FIG. 5, a specific process of the method is as follows:

S501. The first node device receives a contract transaction request initiated by a transaction initiator, and broadcasts the contract transaction request to a second node device.

A user, for example, an administrator, may trigger to entrust another user to surrogate a role through the transaction by sending the contract transaction request to the first node device in the blockchain through a terminal.

S502. The first node device determines that a permission operation type is role entrustment proxy according to the contract transaction request.

For example, the contract transaction request may carry a permission operation type, and in this case, the permission operation type may be directly determined based on the request.

S503. The first node device validates whether a called parameter is legal according to a permission management contract, and performs S504 if yes; otherwise, performs S512.

If the called parameter is illegal, execution of the contract ends, and a result of denial of service is returned.

S504. The first node device verifies whether a signature of the transaction initiator is legal, and performs S505 if yes; otherwise, performs S512.

Specifically, when the signature is illegal, execution of the contract ends, and a contract execution result of denial of service is returned.

S505. The first node device checks whether an accessed entrusted ID is legal, and performs S506 if yes; otherwise, performs S512.

In an embodiment, when the accessed entrusted ID is illegal, a contract execution result of denial of service is returned, and S512 is performed.

S506. The first node device queries a blockchain contract ledger to check whether the transaction initiator has a to-be-entrusted role, and performs S507 if yes; otherwise, performs S512.

When it is found that the transaction initiator does not have the to-be-entrusted role, execution of the contract ends, a contract execution result of denial of service is returned, and S512 is performed.

S507. The first node device queries the blockchain contract ledger to check whether a to-be-entrusted user has a to-be-entrusted role, and performs S507 if not; otherwise, performs S512.

When it is checked that the to-be-entrusted user has the to-be-entrusted role, execution of the contract ends, a contract execution result of denial of service is returned, and S512 is performed.

S508. The first node device checks a level and a term of validity of the to-be-entrusted role of the transaction initiator.

If the level is excessively low or the term of validity expires, execution of the contract ends, a contract execution result of denial of service is returned, and S512 is performed.

S509. When the level is greater than a preset level and the term of validity does not expire, query the blockchain contract ledger to obtain a state of a surrogated role of the to-be-entrusted user.

S510. The first node device checks whether the to-be-entrusted role has been surrogated by the to-be-entrusted user, and performs S511 if not; otherwise, performs S512.

If the to-be-entrusted role has been surrogated, the level and the term of validity of the proxy are updated, a contract execution result of operation success or failure is returned, and S512 is performed.

S511. The first node device adds the to-be-entrusted role as the surrogated role of the to-be-entrusted user, and writes role entrustment result data into a contract cache.

S512. The first node device signs a result and then broadcasts the result to the second node device in the blockchain, and receives a result broadcasted by the second node device.

The result may include a contract execution result (for example, the permission operation succeeds or fails), or a verification result of the permission assignment (for example, the verification succeeds). For example, a contract execution result of this end may be signed and then broadcasted to other node devices in the blockchain.

S513. When the result of the first node device is consistent with the result of the second node device, the first node device writes contract cache data into the blockchain contract ledger.

For example, the blockchain accounting node signs the result and then broadcasts the result, and writes the contract cache data into the blockchain contract ledger after reaching consensus.

Figure 6:
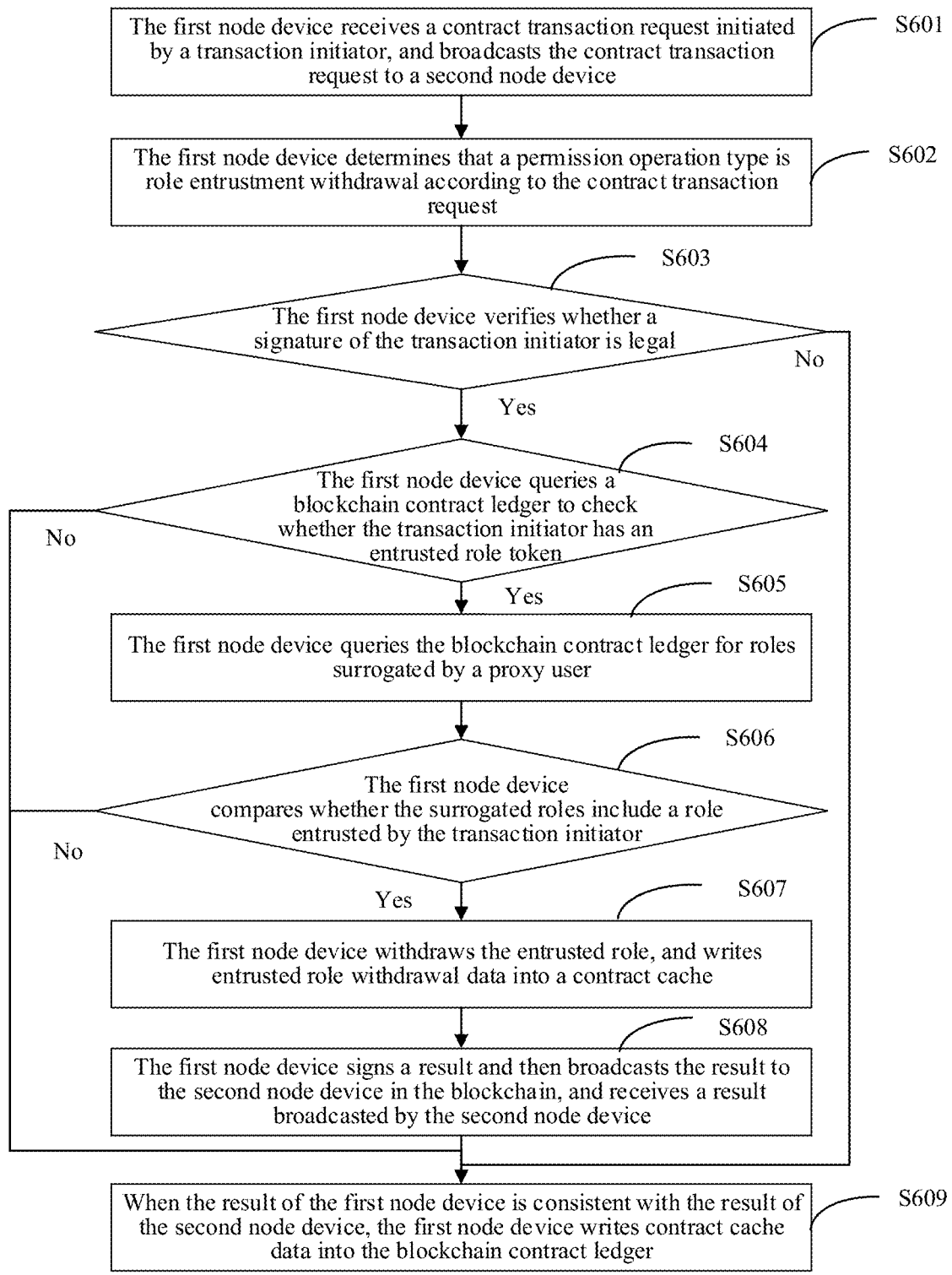
FIG. 6 is a schematic flowchart of withdrawing an entrusted role according to an embodiment of this application.

In an embodiment, a method for withdrawing an entrusted role is provided, and the method may be performed by a first node device in a blockchain. Referring to FIG. 6, a specific process of the method is as follows:

S601. The first node device receives a contract transaction request initiated by a transaction initiator, and broadcasts the contract transaction request to a second node device.

A user, for example, an administrator, may trigger to withdraw a role entrusted to another user to surrogate through the transaction by sending the contract transaction request to the first node device in the blockchain through a terminal.

S602. The first node device determines that a permission operation type is role entrustment withdrawal according to the contract transaction request.

For example, the contract transaction request may carry a permission operation type, and in this case, the permission operation type may be directly determined based on the request.

S603. The first node device verifies whether a signature of the transaction initiator is legal, and performs S604 if yes; otherwise, performs S608.

Specifically, when the signature is illegal, execution of the contract ends, a contract execution result of denial of service is returned, and S608 is performed.

S604. The first node device queries a blockchain contract ledger to check whether the transaction initiator has an entrusted role token, and performs S605 if yes; otherwise, performs S608.

In an embodiment, when the transaction initiator does not have the role token, execution of the contract ends, a contract execution result of denial of service is returned, and S608 is performed.

S605. The first node device queries the blockchain contract ledger, to obtain roles surrogated by a proxy user.

S606. The first node device compares whether the surrogated roles include a role entrusted by the transaction initiator, and S607 is performed if yes; otherwise, S608 is performed.

When the surrogated roles do not include the role entrusted by the transaction initiator, execution of the contract ends, a contract execution result of denial of service is returned, and S608 is performed.

S607. The first node device withdraws the entrusted role, and writes entrusted role withdrawal data into a contract cache.

S608. The first node device signs a result and then broadcasts the result to the second node device in the blockchain, and receives a result broadcasted by the second node device.

S609. When the result of the first node device is consistent with the result of the second node device, the first node device writes contract cache data into the blockchain contract ledger.

For example, the blockchain accounting node signs the result and then broadcasts the result, and writes the contract cache data into the blockchain contract ledger after reaching consensus.

Figure 7:
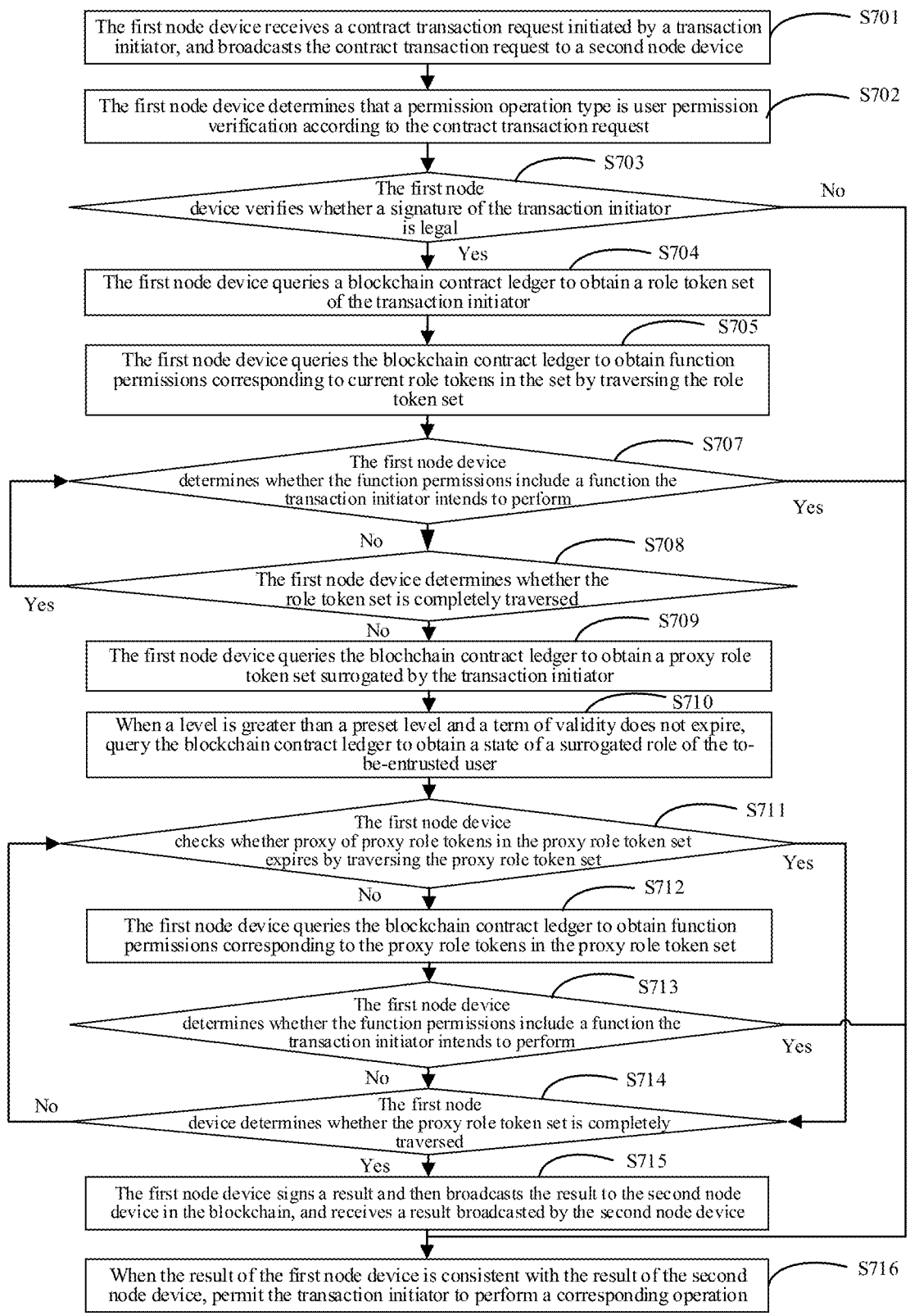
FIG. 7 is a schematic flowchart of verifying user function permission according to an embodiment of this application.

In an embodiment, a user permission verification method is provided, and the method may be performed by a first node device in a blockchain. Referring to FIG. 7, a specific process of the method is as follows:

S701. The first node device receives a contract transaction request initiated by a transaction initiator, and broadcasts the contract transaction request to a second node device.

A user, for example, an administrator, may trigger to verify a user permission through the transaction by sending the contract transaction request to the first node device in the blockchain through a terminal.

S702. The first node device determines that a permission operation type is user permission verification according to the contract transaction request.

For example, the contract transaction request may carry a permission operation type, and in this case, the permission operation type may be directly determined based on the request.

S703. The first node device verifies whether a signature of the transaction initiator is legal, and performs S704 if yes; otherwise, performs S715.

Specifically, when the signature is illegal, execution of the contract ends, a contract execution result of denial of service is returned, and S715 is performed.

S704. The first node device queries a blockchain contract ledger to obtain a role token set of the transaction initiator.

S705. The first node device queries the blockchain contract ledger to obtain function permissions corresponding to current role tokens in the set by traversing the role token set.

S707. The first node device determines whether the function permissions include a function the transaction initiator intends to perform, and performs S708 if not; otherwise, determines that verification on the function permissions succeeds, and performs S715.

S708. The first node device determines whether the role token set is completely traversed; and if not, obtains a next role token in the set, and returns to S707; otherwise, performs S709.

That is, the first node device queries the blockchain contract ledger to obtain function permissions corresponding to all role tokens in the role token set; and compares whether the function permissions include the function the transaction initiator intends to perform. If the function is included, execution of the contract ends, and a result of permitting the operation is returned. If the function is not included, the first node device continues to perform S708.

S709. The first node device queries the blockchain contract ledger to obtain a proxy role token set surrogated by the transaction initiator.

S710. When a level is greater than a preset level and a term of validity does not expire, query the blockchain contract ledger to obtain a state of a surrogated role of the to-be-entrusted user.

S711. The first node device checks whether proxy of the proxy role tokens in the proxy role token set expires by traversing the proxy role token set, and performs S712 if not; otherwise, performs S714.

S712. The first node device queries the blockchain contract ledger to obtain function permissions corresponding to the proxy role tokens in the proxy role token set.

S713. The first node device determines whether the function permissions include a function the transaction initiator intends to perform, and performs S714 if not; otherwise, determines that verification on the function permissions succeeds, and performs S715.

S714. The first node device determines whether the proxy role token set is completely traversed, if not, obtains a next proxy role token in the set, and returns to S712; otherwise, determines that verification on the function permissions succeeds, and performs S715.

S715. The first node device signs a result and then broadcasts the result to the second node device in the blockchain, and receives a result broadcasted by the second node device.

The result may include a contract execution result, for example, may specifically include a result of the function permission verification, such as success or failure, or the function permission verification succeeds or fails.

S716. When the result of the first node device is consistent with the result of the second node device, permit the transaction initiator to perform a corresponding operation.

For example, the blockchain accounting node signs the result and then broadcasts the result, and permits the transaction initiator to perform a corresponding operation after reaching consensus.

This solution can implement decentralized permission management based on a blockchain permission management contract system, and therefore can improve the security of permissions and data.

The solution proposed in the embodiments of this application is applicable to most application scenarios in which permission management is required, such as a blockchain electronic invoice, blockchain supply chain finance, and Internet evidence storage. Description is made by using an example in which a blockchain electronic invoice is used as product performance in this embodiment.

Referring to Table 1, Table 1 shows related permissions configured for roles:

TABLE 1

Table of configuration relationship between roles and permissions

| Roles | Permissions |
|---|---|
| Individual user | Capable of receiving invoice assets, viewing and transferring details of invoice assets in own name |
| Enterprise user | Capable of applying for blank invoice assets, issuing invoices and receiving invoices, and viewing details of invoice assets in own name |
| Service provider user | Capable of applying for invoices for enterprise users, issuing and receiving invoices, and viewing details |
| Local bureau user | Capable of registering enterprise users and service provider users, setting tax control instructions, querying tax control instructions, and viewing detailed information of invoices of all registered enterprises |
| Parent bureau user | Capable of registering parent bureau users and local bureau users, and having a permission of viewing all data and an asset transfer permission |

Using a registration permission as an example, referring to Table 2, users of different types may have different registration permissions. Theoretically, the parent bureau users may have the highest permission. However, in an actual case, the parent bureau does not participate in actual services. Therefore, for the oneness of responsibility, only registration permissions of the tax bureau are maintained for the parent bureau users during design. In addition, the individual users are more difficult to manage and more dispersed than the enterprises users. Therefore, self-registration processes of the individual users are not open for the time being, and registrations of all individual users need to be surrogated by service providers.

Detailed registration permissions are as follows:

TABLE 2

Relation table between users and registration permissions

| | Whether parent bureau user can be registered | Whether local bureau user can be registered | Whether enterprise user can be registered | Whether service provider user can be registered | Whether individual user can be registered |
|---|---|---|---|---|---|
| Parent bureau user | Yes | Yes | No | No | No |
| Local bureau user | No | No | Yes | Yes | No |
| Enterprise user | No | No | No | No | No |
| Service provider user | No | No | No | No | Yes |
| Individual user | No | No | No | No | No |

Figure 8:
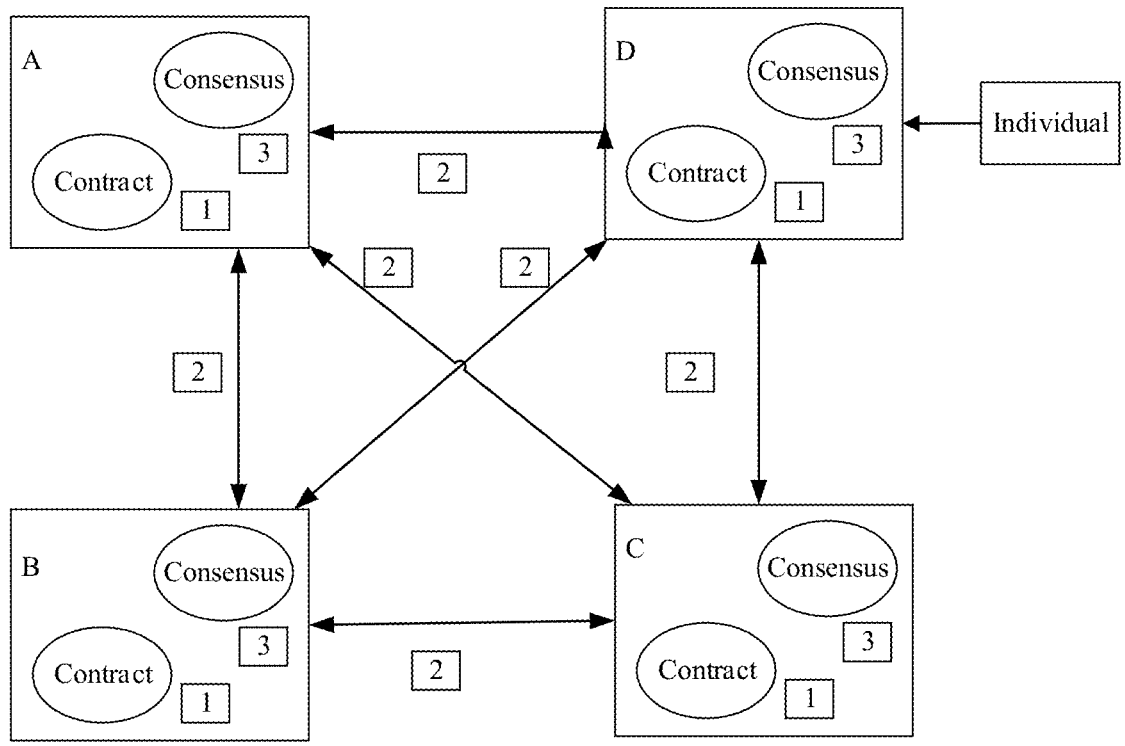
FIG. 8 is a schematic architectural diagram of a smart contract system according to an embodiment of this application.

Referring to FIG. 8, after the user registration permission is deployed to the smart contract system, node devices A, B, C, and D based on a blockchain include the same contract content. In this case, users of different types may submit registration applications to the smart contract system.

An application registration process of an individual user is described as follows:

First step: After the node device D receives a personal request, the smart contract performs permission checking, and the individual user has no permission to reject the registration, and the node device D broadcasts the request message to the node devices A, B, and C. The node devices A, B, and C also perform smart contract permission checking after receiving the request.

Second step: The node devices A, B, C, and D broadcast a checking result.

Third step: After receiving the checking result, the node devices A, B, C, and D checks whether the checking results are consistent by using a consensus module, and returns a result of rejecting the registration application to the individual user.

Registration processes of users of other types are similar to the process of the individual user, and therefore are not described again.

In the embodiments of this application, the decentralized smart contract is used to automatically manage permissions, so that the situation in which the malicious nodes in the consortium blockchain do wrong can be eliminated and the security of the consortium blockchain is enhanced. In addition, by using the smart contract to manage permissions, it can be more easily expanded to different services, and services do not need to be customized as in the centralized management.

To implement the foregoing method better, correspondingly, an embodiment of this application further provides a permission management apparatus. The permission management apparatus may be specifically integrated in a node device in a blockchain. The node device may be a device such as a server.

Figure 9A:
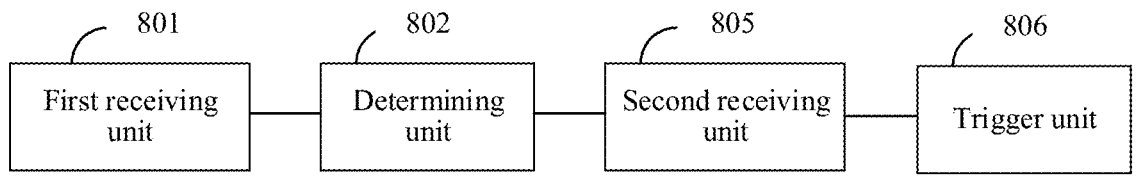
FIG. 9a is a schematic structural diagram of a permission management apparatus according to an embodiment of this application.

For example, as shown in FIG. 9a, the permission management apparatus may include a first receiving unit 801, a determining unit 802, a second receiving unit 805, and a trigger unit 806 as follows:

The first receiving unit 801 is configured to receive a permission operation request from a client, and forward the permission operation request to a second node device in the blockchain, the second node device being a node device in the blockchain other than the first node device.

The determining unit 802 is configured to obtain a first contract execution result according to the permission operation request.

The second receiving unit 805 is configured to receive a second contract execution result broadcasted by the second node device based on the permission operation request.

The trigger unit 806 is configured to trigger the first contract execution result to be valid in a case that the first contract execution result is consistent with the second contract execution result.

Figure 9B:
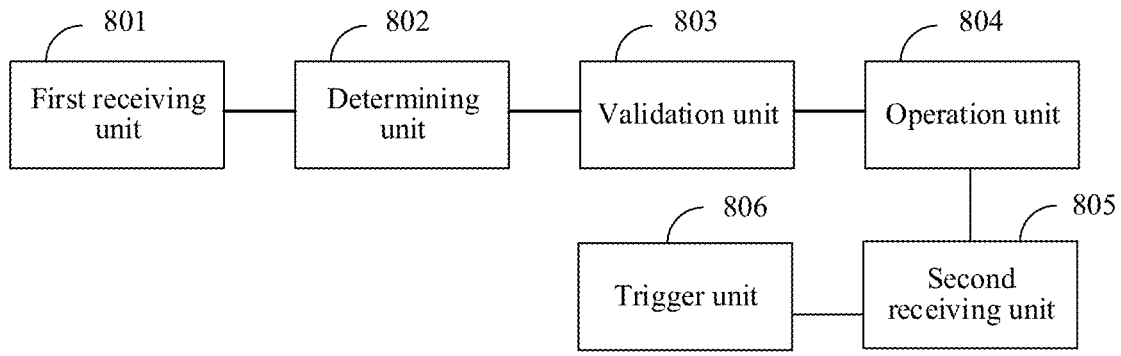
FIG. 9b is a schematic structural diagram of a permission management apparatus according to an embodiment of this application.

In an embodiment, FIG. 9b shows a schematic structural diagram of the permission management apparatus according to this embodiment of this application. The determining unit 802 is specifically configured to:

determine a to-be-operated permission operation type according to the permission operation request; and the apparatus further includes:

a validation unit 803, configured to perform validation logic corresponding to the permission operation type based on a permission management contract; and an operation unit 804, configured to perform, in a case that the validation succeeds, a permission operation corresponding to the permission operation type, to obtain the first contract execution result.

Figure 9C:
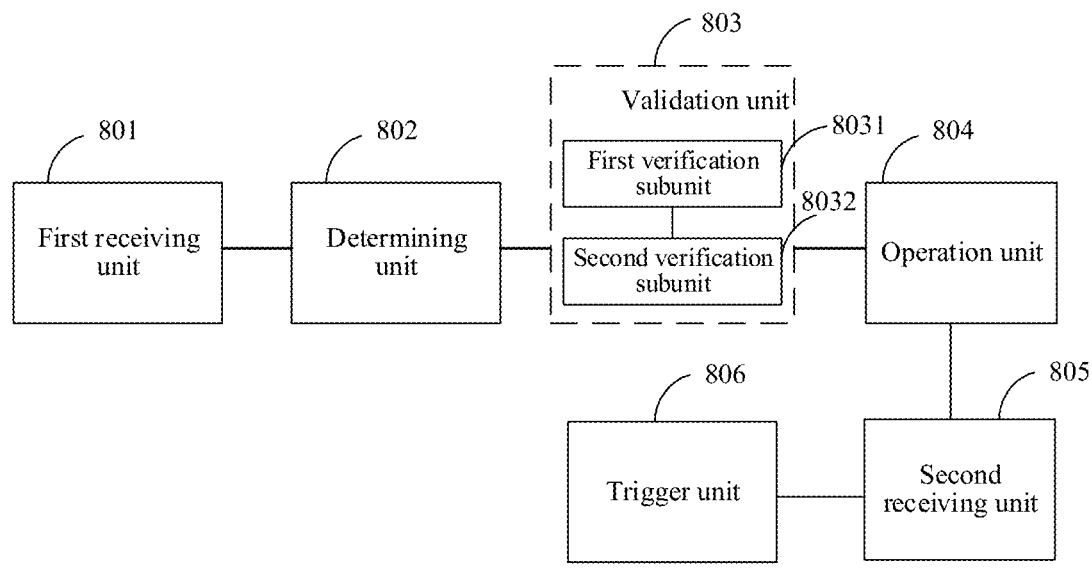
FIG. 9c is a schematic structural diagram of a permission management apparatus according to an embodiment of this application.

In an embodiment, referring to FIG. 9c, the validation unit 803 may include:

a first verification subunit 8031, configured to perform verification on operation legality of a request initiating user based on the permission management contract.

a second verification subunit 8032, configured to perform, in a case that an operation of the request initiating user is legal, verification on permission information of an operation object corresponding to the permission operation type; and determine that the validation succeeds in a case that the verification on the permission information succeeds.

In an embodiment, the first verification subunit 8031 may be specifically configured to:

perform verification on a function permission and a signature of the request initiating user based on the permission management contract; and determine that the operation of the request initiating user is legal in a case that the verification on the function permission and the signature of the request initiating user succeeds.

In an embodiment, the permission operation type includes permission assignment; and the second verification subunit 8032 may be specifically configured to:

obtain, in a case that the operation of the request initiating user is legal, an assigned function permission set corresponding to a to-be-assigned role from a blockchain contract ledger, the blockchain contract ledger including a mapping relationship between a user, a role, and assigned function permissions; and determine that the verification on the permission information succeeds in a case that the assigned function permission set does not include a to-be-assigned permission.

The operation unit 804 is configured to add the to-be-assigned permission to the assigned function permission set in a case that the validation succeeds.

In an embodiment, the permission operation type includes role assignment; and the second verification subunit 8032 may be specifically configured to:

assign a role token to a to-be-assigned user based on the permission management contract in a case that the operation of the request initiating user is legal;

obtain a role token set corresponding to the to-be-assigned user from a blockchain contract ledger; and determine that the verification on the permission information succeeds in a case that the role token set does not include the role token.

The operation unit 804 is configured to add the role token to the role token set in a case that the validation succeeds.

In an embodiment, the permission operation type includes permission transfer; and the second verification subunit 8032 may be specifically configured to:

check identity legality of the to-be-transferred user in a case that the operation of the request initiating user is legal; and determine that the verification on the permission information succeeds in a case that an identity of the to-be-transferred user is legal.

The operation unit 804 is configured to update a user of a to-be-transferred permission to the to-be-transferred user in a case that the validation succeeds.

In an embodiment, the first verification subunit 8031 may be specifically configured to:

perform verification on a call parameter and a signature of the request initiating user based on the permission management contract; and determine that the verification on operation legality of the request initiating user succeeds in a case that the verification on the call parameter and the signature succeeds.

In an embodiment, the permission operation type includes role entrustment proxy; and the second verification subunit 8032 may be specifically configured to:

check identity legality of a to-be-entrusted user in a case that the operation of the request initiating user is legal;

check roles of the request initiating user and the to-be-entrusted user based on a to-be-entrusted role in a case that an identity of the to-be-entrusted user is legal;

obtain, in a case of finding that the request initiating user has the to-be-entrusted role and the to-be-entrusted user does not have the to-be-entrusted role, a surrogated role of the to-be-entrusted user from a blockchain contract ledger; and determine that the verification on the permission information succeeds in a case that the surrogated role does not include the to-be-entrusted role.

The operation unit 804 is configured to add the to-be-entrusted role as the surrogated role of the to-be-entrusted user in a case that the validation succeeds.

In an embodiment, the permission operation type includes role entrustment withdrawal; and the second verification subunit 8032 may be specifically configured to:

check, in a case that the operation of the request initiating user is legal, whether the request initiating user has a to-be-withdrawn role token;

obtain a proxy role token set of a proxy user from a blockchain contract ledger if there is a to-be-withdrawn role token; and determine that the verification on the permission information succeeds in a case that the proxy role token set includes the to-be-withdrawn role token; and withdraw the to-be-withdrawn role token from the proxy role token set In an embodiment, the first verification subunit 8031 may be specifically configured to:

determine that the verification on the function permission succeeds in a case that function permissions corresponding to role tokens in the role token set include a target function permission required by the permission operation type;

obtain a proxy role token set surrogated by the request initiating user from the blockchain contract ledger in a case that the function permissions corresponding to the role tokens in the role token set do not include the target function permission required by the permission operation type;

determine that the verification on the function permission succeeds in a case that function permissions corresponding to proxy role tokens in the proxy role token set include a target function permission required by the permission operation type; and perform verification on a signature of the request initiating user based on the permission management contract.

During specific implementation, the foregoing units may be implemented as independent entities, or may be randomly combined, or may be implemented as one same entity or several entities. For specific implementation of the foregoing units, reference may be made to the foregoing method embodiments. Details are not described herein again.

As can be learned from the above, the permission management apparatus in this embodiment may receive a permission operation request from the client by using the first receiving unit 801, and forward the permission operation request to a second node device in a blockchain, the second node device being a node device in the blockchain other than the first node device; determine a to-be-operated permission operation type according to the permission operation request by using the determining unit 802; perform validation logic corresponding to the permission operation type based on a permission management contract by using the validation unit 803; perform, in a case that the validation succeeds, a permission operation corresponding to the permission operation type by using the operation unit 804, to obtain a first contract execution result; receive a second contract execution result broadcasted by the second node device based on the permission operation request by using the second receiving unit 805; and trigger the first contract execution result to be valid by using the trigger unit 806 in a case that the first contract execution result is consistent with the second contract execution result. This solution can implement decentralized permission management based on a blockchain permission management contract system, to compare the first contract execution result of the node device with the received second contract execution result, and trigger the first contract execution result to be valid after consensus is reached when a contract execution result of the node device is consistent with contract execution results of other node devices, thereby improving the security of permissions and data.

Figure 10:
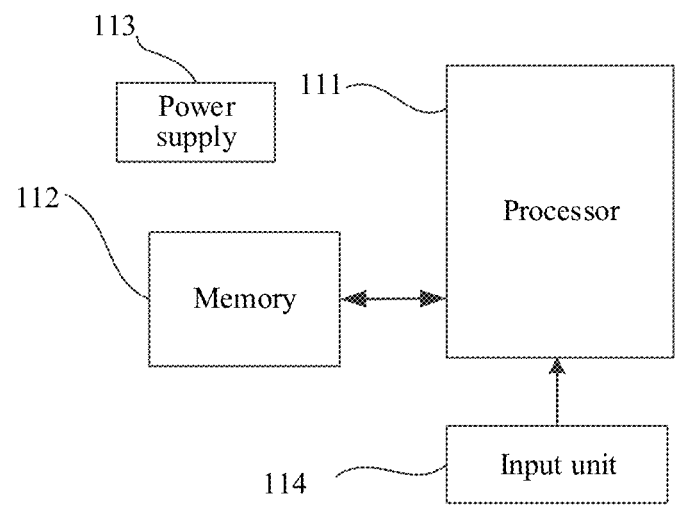
FIG. 10 is a schematic structural diagram of a data processing device according to an embodiment of this application.

In addition, an embodiment of this application further provides a data processing device. FIG. 10 shows a schematic structural diagram of the data processing device such as a network device involved in this embodiment of this application. Specifically, The network device may include components such as a processor 111 including one or more processing cores, a memory 112 including one or more computer-readable storage media, a power supply 113, and an input unit 114. A person skilled in the art may understand that the structure of the network device shown in FIG. 11 does not constitute a limitation to the network device, and the network device may include more or fewer components than those shown in the figure, or some components may be combined, or a different component deployment may be used.

The processor 111 is the control center of the network device, connects all parts of the entire network device by using various interfaces and lines, and executes various functions and processing data of the network device by running or executing software programs and/or modules stored in the memory 112, and calling data stored in the memory 112, thereby performing overall monitoring on the network device. Optionally, the processor 111 may include one or more processing cores. Preferably, the processor 111 may be integrated as an application processor and a modem processor. The application processor mainly processes an operating system, a user interface, an application program, and the like. The modem processor mainly processes wireless communication. It may be understood that, the modem processor may alternatively not be integrated in the processor 111.

The memory 112 may be configured to store the software programs and modules. The processor 111 runs the software programs and modules stored in the memory 112, to perform various function application and data processing. The memory 112 may mainly include a program storage area and a data storage area. The program storage area may store an operating system, an application program required by at least one function (such as a sound playing function and an image display function), and the like. The data storage area may store data created according to use of the network device, and the like. In addition, the memory 112 may include a high speed random access memory, and may further include a non-volatile memory, such as at least one magnetic disk storage device, a flash memory device or other non-volatile solid state storage devices. Correspondingly, the memory 112 may further include a memory controller, so that the processor 111 can access the memory 112.

The network device further includes the power supply 113 that supplies power to the components. Preferably, the power supply 113 may be logically connected to the processor 111 through a power management system, to implement functions of charging and discharging management and power consumption management through the power management system. The power supply 113 may further include one or more of a direct current or alternating current power supply, a recharging system, a power failure detection circuit, a power converter or inverter, a power state indicator, and the like.

The network device may further include the input unit 114. The input unit 114 may be configured to receive input digit or character information and generate keyboard, mouse, joystick, optical, or trackball signal input related to user settings and function control.

Although not shown in the figure, the network device may further include a display unit, and the like. Details are not described herein again. Specifically, in this embodiment, the processor 111 in the network device loads executable files corresponding to processes of one or more application programs to the memory 112 according to the following instructions, and the processor 111 runs the application programs stored in the memory 112, to implement various functions as follows:

receiving a permission operation request from a client, and forwarding the permission operation request to a second node device in a blockchain, the second node device being a node device in the blockchain other than the first node device; obtaining a first contract execution result according to the permission operation request; receiving a second contract execution result broadcasted by the second node device based on the permission operation request; and triggering the first contract execution result to be valid in a case that the first contract execution result is consistent with the second contract execution result.

For the specific implementations of the foregoing operations, reference may be made to the foregoing embodiments, and details are not described herein again.

As can be learned from the above, the network device of this embodiment may be used as a node device such as a first node device in a blockchain, and the device may receive a permission operation request from a client, and forward the permission operation request to a second node device in the blockchain, the second node device being a node device in the blockchain other than the first node device; obtain a first contract execution result according to the permission operation request; receive a second contract execution result broadcasted by the second node device based on the permission operation request; and trigger the first contract execution result to be valid in a case that the first contract execution result is consistent with the second contract execution result. This solution can implement decentralized permission management based on a blockchain permission management contract system, to compare the first contract execution result of the node device with the received second contract execution result, and trigger the first contract execution result to be valid after consensus is reached when a contract execution result of the node device is consistent with contract execution results of other node devices, thereby improving the security of permissions and data.

A person of ordinary skill in the art may understand that, all or some steps of the methods of the foregoing embodiments may be implemented through instructions, or implemented through instructions controlling relevant hardware, and the instructions may be stored in a computer-readable storage medium and loaded and executed by a processor.

In an implementation, a computer device is provided. The computer device may be a server or a terminal. The computer device includes a processor, a communication interface, a memory, and a communication bus. The processor, the communication interface, and the memory communicate with each other by using the communication bus. The communication interface is an interface of a communication module.

The memory is configured to store program code and transmit the program code to the processor.

The processor is configured to call instructions of the program code in the memory to perform the method in the foregoing embodiments.

An embodiment of this application further provides a storage medium, the storage medium being configured to store a computer program, the computer program being configured to perform the method in the foregoing embodiments. The storage medium stores a plurality of instructions, and the instructions can be loaded by a processor, to perform the method in the foregoing embodiments. For example, the instructions may perform the following steps:

receiving a permission operation request from a client, and forwarding the permission operation request to a second node device in a blockchain, the second node device being a node device in the blockchain other than the first node device; obtaining a first contract execution result according to the permission operation request; receiving a second contract execution result broadcasted by the second node device based on the permission operation request; and triggering the first contract execution result to be valid in a case that the first contract execution result is consistent with the second contract execution result.

For the specific implementations of the foregoing operations, reference may be made to the foregoing embodiments, and details are not described herein again.

The storage medium may include: a read-only memory (ROM), a random access memory (RAM), a magnetic disk, an optical disc, or the like.

Because the instructions stored in the storage medium may perform the steps of any model training method provided in the embodiments of this application, the instructions can implement beneficial effects that may be implemented by any method provided in the embodiments of this application. For details, reference may be made to the foregoing embodiments. Details are not described herein again.

In an exemplary embodiment, an embodiment of this application further provides a computer program product including instructions, the computer program product, when run on a server, causing the server to perform the method in the foregoing embodiments.

The permission management method, permission verification method, and related apparatuses provided in the embodiments of this application are described in detail above. The principle and implementations of this application are described herein by using specific examples. The descriptions of the foregoing embodiments are merely used for helping understand the method and core ideas of this application. In addition, a person skilled in the art can make variations to this application in terms of the specific implementations and application scopes according to the ideas of this application. Therefore, the content of this specification shall not be construed as a limit on this application.

What is claimed is:

1. A permission verification method, performed by a first node device deployed with a permission management contract in a blockchain, the method comprising:
    receiving a permission operation request from a client device;
    forwarding the permission operation request from the client device to a second node device in the blockchain, the second node device being a node device in the blockchain other than the first node device and being deployed with the same permission management contract as the first node device;
    generating a first contract execution result according to the permission operation request from the client device and the permission management contract;
    receiving a second contract execution result broadcasted by the second node device based on the permission operation request from the client device and the permission management contract;
    determining that user permission verification for the permission operation request succeeds in a case that the first contract execution result is consistent with the second contract execution result; and
    in accordance with a determination that the user permission verification for the permission operation request succeeds, writing contract cache data associated with the first contract execution result into the blockchain.

2. The permission verification method according to claim 1, wherein the generating a first contract execution result according to the permission operation request comprises:
    determining a to-be-operated permission operation type according to the permission operation request, the permission operation type being user permission verification;
    performing validation logic corresponding to the permission operation type based on the permission management contract; and performing, in a case that the validation succeeds, a permission operation corresponding to the permission operation type, to obtain the first contract execution result.

3. The permission verification method according to claim 2, wherein the performing validation logic corresponding to the permission operation type based on the permission management contract comprises:

performing verification on operation legality of a request initiating user based on the permission management contract;

performing, in a case that an operation of the request initiating user is legal, verification on permission information of an operation object corresponding to the permission operation type; and determining that the validation succeeds in a case that the verification on the permission information succeeds.

4. The permission verification method according to claim 3, wherein the performing verification on operation legality of a request initiating user based on the permission management contract comprises:

performing verification on an operation parameter based on the permission management contract, the operation parameter comprising one or a combination of a call parameter, and a function permission and a signature of the request initiating user; and determining that the operation of the request initiating user is legal in a case that the verification succeeds.

5. The permission verification method according to claim 3, wherein the performing verification on operation legality of a request initiating user based on the permission management contract comprises:

performing verification on a call parameter and a signature of the request initiating user based on the permission management contract; and determining that the verification on operation legality of the request initiating user succeeds in a case that the verification on the call parameter and the signature succeeds.

6. The permission verification method according to claim 4, wherein the performing verification on an operation parameter based on the permission management contract comprises:

obtaining a role token set of the request initiating user from a blockchain contract ledger based on the permission management contract;

determining that the verification on the function permission succeeds in a case that function permissions corresponding to role tokens in the role token set comprise a function needing to be performed by the request initiating user;

obtaining a proxy role token set surrogated by the request initiating user from the blockchain contract ledger in a case that the function permissions corresponding to the role tokens in the role token set do not comprise the function needing to be performed by the request initiating user; and determining that the verification on the function permission succeeds in a case that function permissions corresponding to proxy role tokens in a proxy role token set comprise the function needing to be performed by the request initiating user.

7. The permission verification method according to claim 6, wherein the determining that the verification on the function permission succeeds in a case that function permissions corresponding to role tokens in the role token set comprise a function needing to be performed by the request initiating user comprises:

querying the function permissions corresponding to the role tokens in the role token set by traversing the role token set;

determining whether the function permissions corresponding to the role tokens comprise the function needing to be performed by the request initiating user;

determining that function permission verification succeeds in a case that the function permissions corresponding to the role tokens comprise the function;

determining whether the role token set is completely traversed in a case that the function permissions corresponding to the role tokens do not comprise the function; and performing the operation of querying the function permissions corresponding to the role tokens in the role token set by traversing the role token set in a case that the role token set is not completely traversed.

8. The permission verification method according to claim 7, wherein the obtaining, in a case that the function permissions corresponding to the role tokens in the role token set do not comprise the function needing to be performed by the request initiating user, a proxy role token set surrogated by the request initiating user from the blockchain contract ledger comprises:

determining, in a case that the role token set is completely traversed, that the function permissions corresponding to the role tokens in the role token set do not comprise the function needing to be performed by the request initiating user; and obtaining a proxy role token set of the request initiating user from the blockchain contract ledger.

9. The permission verification method according to claim 8, wherein the determining, in a case that function permissions corresponding to proxy role tokens in a proxy role token set comprise a function needing to be performed by the request initiating user, that the verification on the function permission succeeds comprises:

checking whether proxy of the proxy role tokens in the proxy role token set expires by traversing the proxy role token set;

querying the function permissions corresponding to the proxy role tokens in the proxy role token set in a case that the proxy does not expire;

determining whether the function permissions corresponding to the proxy role tokens comprise the function needing to be performed by the request initiating user; and determining that function permission verification succeeds in a case that the function permissions corresponding to the proxy role tokens comprise the function.

10. A computer device acting as a first node device deployed with a permission management contract in a blockchain, comprising:

a processor, a communication interface, a memory, and a communication bus, the processor, the communication interface, and the memory communicating with each other by using the communication bus and the communication interface being an interface of a communication module;

the memory being configured to store program code and transmit the program code to the processor; and the processor being configured to call instructions of the program code in the memory to perform a plurality of operations including:
receiving a permission operation request from a client device;
forwarding the permission operation request from the client device to a second node device in the blockchain, the second node device being a node device in the blockchain other than the first node device and being deployed with the same permission management contract as the first node device;
generating a first contract execution result according to the permission operation request from the client device and the permission management contract;
receiving a second contract execution result broadcasted by the second node device based on the permission operation request from the client device and the permission management contract;
determining that user permission verification for the permission operation request succeeds in a case that the first contract execution result is consistent with the second contract execution result; and
in accordance with a determination that the user permission verification for the permission operation request succeeds, writing contract cache data associated with the first contract execution result into the blockchain.

11. The computer device according to claim 10, wherein the generating a first contract execution result according to the permission operation request comprises:
determining a to-be-operated permission operation type according to the permission operation request, the permission operation type being user permission verification;
performing validation logic corresponding to the permission operation type based on the permission management contract; and
performing, in a case that the validation succeeds, a permission operation corresponding to the permission operation type, to obtain the first contract execution result.

12. The computer device according to claim 11, wherein the performing validation logic corresponding to the permission operation type based on the permission management contract comprises:
performing verification on operation legality of a request initiating user based on the permission management contract;
performing, in a case that an operation of the request initiating user is legal, verification on permission information of an operation object corresponding to the permission operation type; and
determining that the validation succeeds in a case that the verification on the permission information succeeds.

13. The computer device according to claim 12, wherein the performing verification on operation legality of a request initiating user based on the permission management contract comprises:
performing verification on an operation parameter based on the permission management contract, the operation parameter comprising one or a combination of a call parameter, and a function permission and a signature of the request initiating user; and
determining that the operation of the request initiating user is legal in a case that the verification succeeds.

14. The computer device according to claim 12, wherein the performing verification on operation legality of a request initiating user based on the permission management contract comprises:
performing verification on a call parameter and a signature of the request initiating user based on the permission management contract; and
determining that the verification on operation legality of the request initiating user succeeds in a case that the verification on the call parameter and the signature succeeds.

15. The computer device according to claim 13, wherein the performing verification on an operation parameter based on the permission management contract comprises:
obtaining a role token set of the request initiating user from a blockchain contract ledger based on the permission management contract;
determining that the verification on the function permission succeeds in a case that function permissions corresponding to role tokens in the role token set comprise a function needing to be performed by the request initiating user;
obtaining a proxy role token set surrogated by the request initiating user from the blockchain contract ledger in a case that the function permissions corresponding to the role tokens in the role token set do not comprise the function needing to be performed by the request initiating user; and
determining that the verification on the function permission succeeds in a case that function permissions corresponding to proxy role tokens in a proxy role token set comprise the function needing to be performed by the request initiating user.

16. The computer device according to claim 15, wherein the determining that the verification on the function permission succeeds in a case that function permissions corresponding to role tokens in the role token set comprise a function needing to be performed by the request initiating user comprises:
querying the function permissions corresponding to the role tokens in the role token set by traversing the role token set;
determining whether the function permissions corresponding to the role tokens comprise the function needing to be performed by the request initiating user;
determining that function permission verification succeeds in a case that the function permissions corresponding to the role tokens comprise the function; and
determining whether the role token set is completely traversed in a case that the function permissions corresponding to the role tokens do not comprise the function; and
performing the operation of querying the function permissions corresponding to the role tokens in the role token set by traversing the role token set in a case that the role token set is not completely traversed.

17. The computer device according to claim 16, wherein the obtaining, in a case that the function permissions corresponding to the role tokens in the role token set do not comprise the function needing to be performed by the request initiating user, a proxy role token set surrogated by the request initiating user from the blockchain contract ledger comprises:
determining, in a case that the role token set is completely traversed, that the function permissions corresponding to the role tokens in the role token set do not comprise the function needing to be performed by the request initiating user; and obtaining a proxy role token set of the request initiating user from the blockchain contract ledger.

18. The computer device according to claim 17, wherein the determining, in a case that function permissions corresponding to proxy role tokens in a proxy role token set comprise a function needing to be performed by the request initiating user, that the verification on the function permission succeeds comprises:

checking whether proxy of the proxy role tokens in the proxy role token set expires by traversing the proxy role token set;

querying the function permissions corresponding to the proxy role tokens in the proxy role token set in a case that the proxy does not expire;

determining whether the function permissions corresponding to the proxy role tokens comprise the function needing to be performed by the request initiating user; and determining that function permission verification succeeds in a case that the function permissions corresponding to the proxy role tokens comprise the function.

19. A non-transitory computer-readable storage medium, configured to store a plurality of computer programs, the computer programs, when executed by a computer device acting as a first node device deployed with a permission management contract in a blockchain, causing the computer device to perform a plurality of operations including:

receiving a permission operation request from a client device;

forwarding the permission operation request from the client device to a second node device in the blockchain, the second node device being a node device in the blockchain other than the first node device and being deployed with the same permission management contract as the first node device;

generating a first contract execution result according to the permission operation request from the client device and the permission management contract;

receiving a second contract execution result broadcasted by the second node device based on the permission operation request from the client device and the permission management contract;

determining that user permission verification for the permission operation request succeeds in a case that the first contract execution result is consistent with the second contract execution result; and in accordance with a determination that the user permission verification for the permission operation request succeeds, writing contract cache data associated with the first contract execution result into the blockchain.

20. The non-transitory computer-readable storage medium according to claim 19, wherein the generating a first contract execution result according to the permission operation request comprises:

determining a to-be-operated permission operation type according to the permission operation request, the permission operation type being user permission verification;

performing validation logic corresponding to the permission operation type based on the permission management contract; and performing, in a case that the validation succeeds, a permission operation corresponding to the permission operation type, to obtain the first contract execution result.

* * * * *